United States Patent [19]
Suzuki et al.

[11] Patent Number: 5,137,105
[45] Date of Patent: Aug. 11, 1992

[54] SYSTEM AND METHOD FOR CONTROLLING TORQUE OF DRIVING WHEEL

[75] Inventors: Norio Suzuki; Hiroshi Kitagawa; Yoshio Wazaki; Tetsuya Oono, all of Saitama, Japan

[73] Assignee: Honda Giken Kogyo Kabushiki Kaisha, Tokyo, Japan

[21] Appl. No.: 642,580

[22] Filed: Jan. 17, 1991

[30] Foreign Application Priority Data

| Jan. 19, 1990 | [JP] | Japan | 2-10122 |
| Jan. 19, 1990 | [JP] | Japan | 2-10123 |
| Feb. 8, 1990 | [JP] | Japan | 2-12587[U] |
| Mar. 28, 1990 | [JP] | Japan | 2-80527 |
| Apr. 10, 1990 | [JP] | Japan | 2-38282[U] |
| Apr. 25, 1990 | [JP] | Japan | 2-109743 |
| Jul. 27, 1990 | [JP] | Japan | 2-199611 |

[51] Int. Cl.$^5$ .............. B60K 28/16; F02D 41/310
[52] U.S. Cl. .................. 180/197; 364/424.1; 364/426.02; 364/426.03
[58] Field of Search ......... 180/197; 364/424.1, 364/426.01, 426.02, 426.03

[56] References Cited

U.S. PATENT DOCUMENTS 4,947,330 8/1990 Hiramatsu .................. 364/424.1
5,009,279 4/1991 Matsuda ..................... 364/424.1

FOREIGN PATENT DOCUMENTS 62-7954 1/1987 Japan.

Primary Examiner—Mitchell J. Hill
Attorney, Agent, or Firm—Armstrong & Kubovcik

[57] ABSTRACT

In reducing the output from an internal combustion engine by a driving-wheel torque reducing means when a driving wheel is slipping excessively, thereby inhibiting the excessive slipping of the driving wheel, a total torque transmitted from the internal combustion engine to the driving wheel and a surplus torque consumed for the excessive slipping of the driving wheel are found, and the output from the internal combustion engine is reduced on the basis of an effective driving-wheel torque found from the total driving-wheel torque and the surplus torque and transmittable to a road surface. Alternatively, the output from the internal combustion engine may be reduced on the basis of the total torque transmitted from the internal combustion engine to the driving wheel and the surplus torque consumed for the excessive slipping of the driving wheel. Consequently, the driving-wheel torque can be converged quickly to a proper value, and it is possible to provide a closer control of the driving-wheel torque.

28 Claims, 21 Drawing Sheets

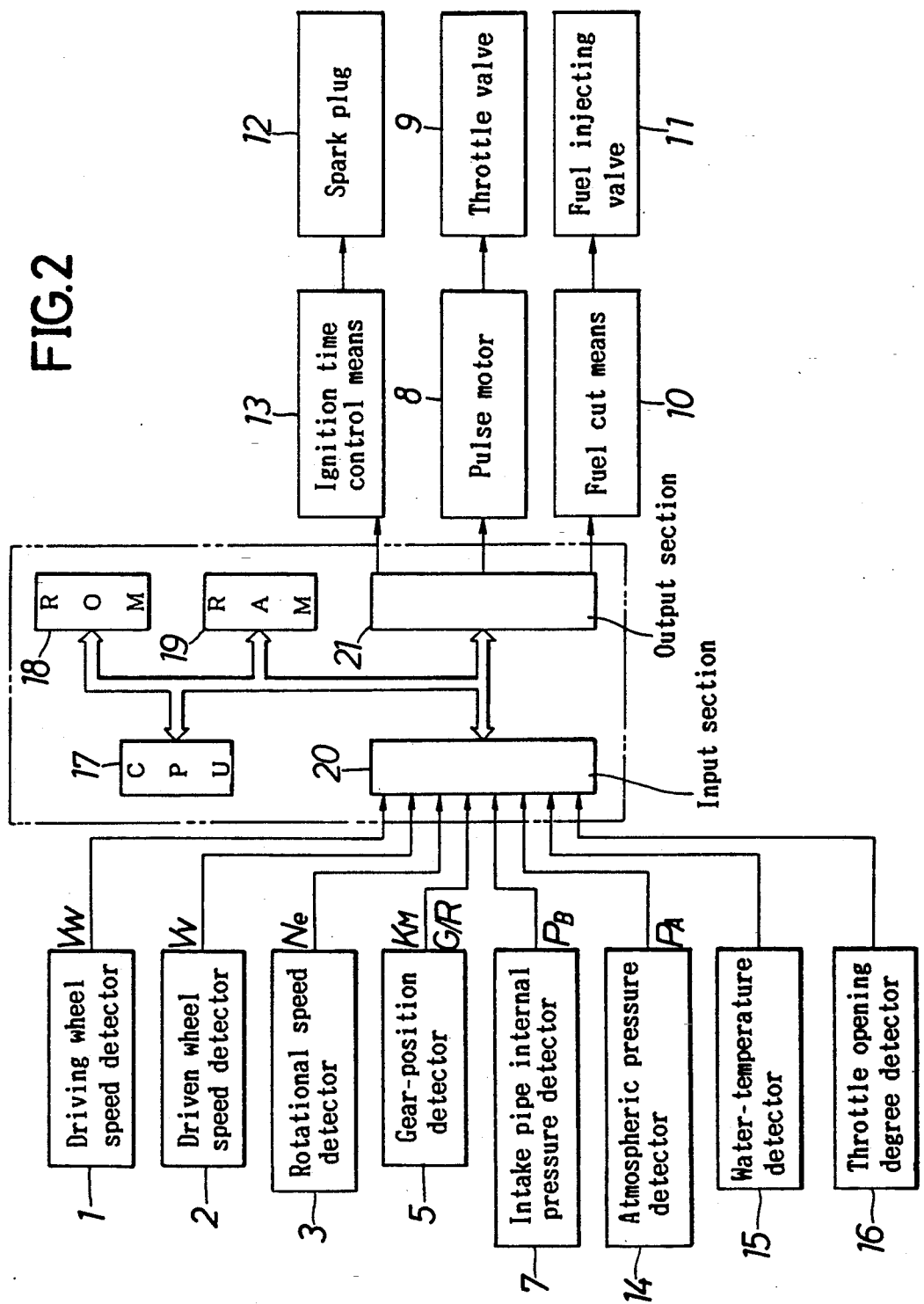

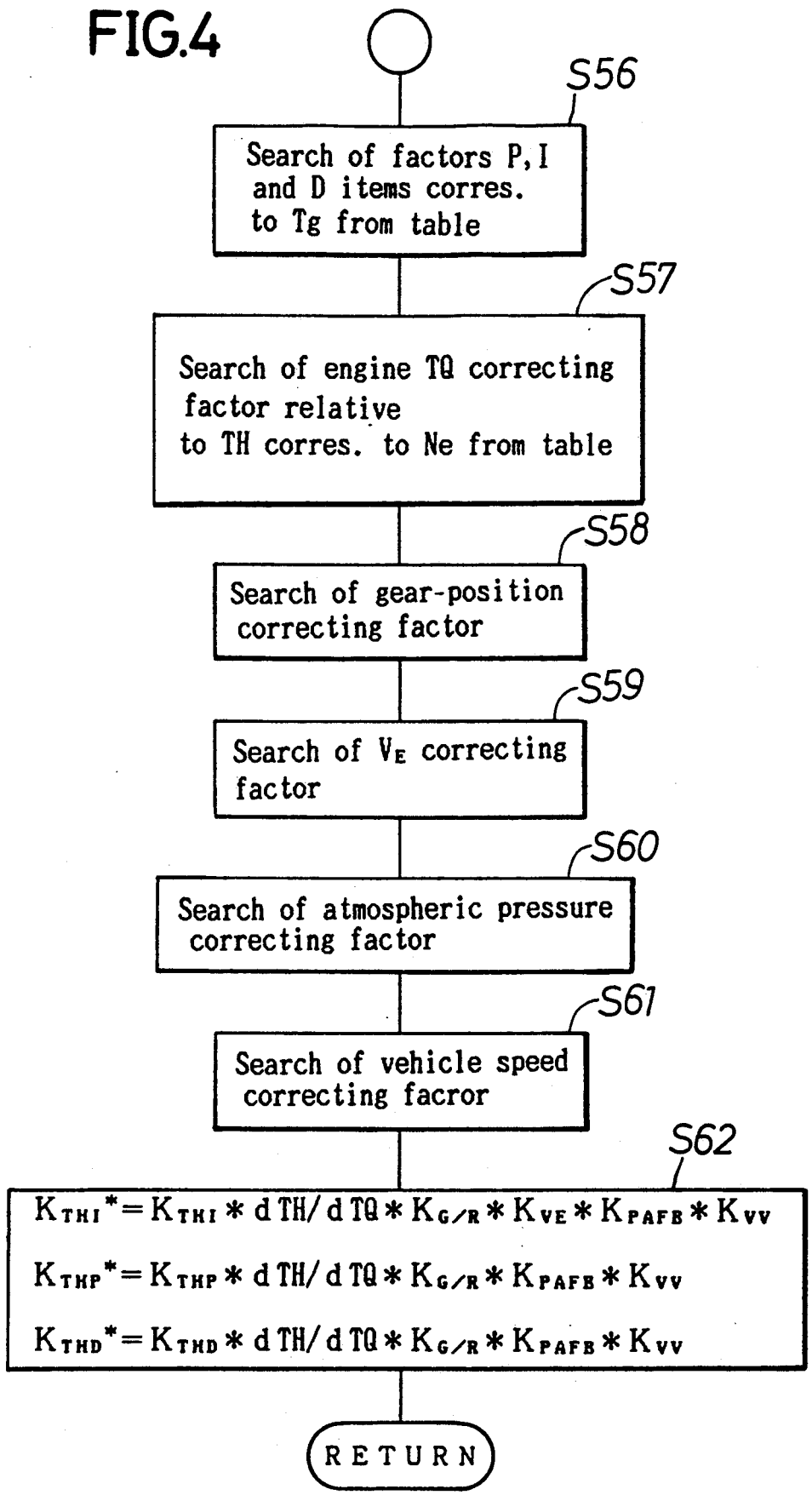

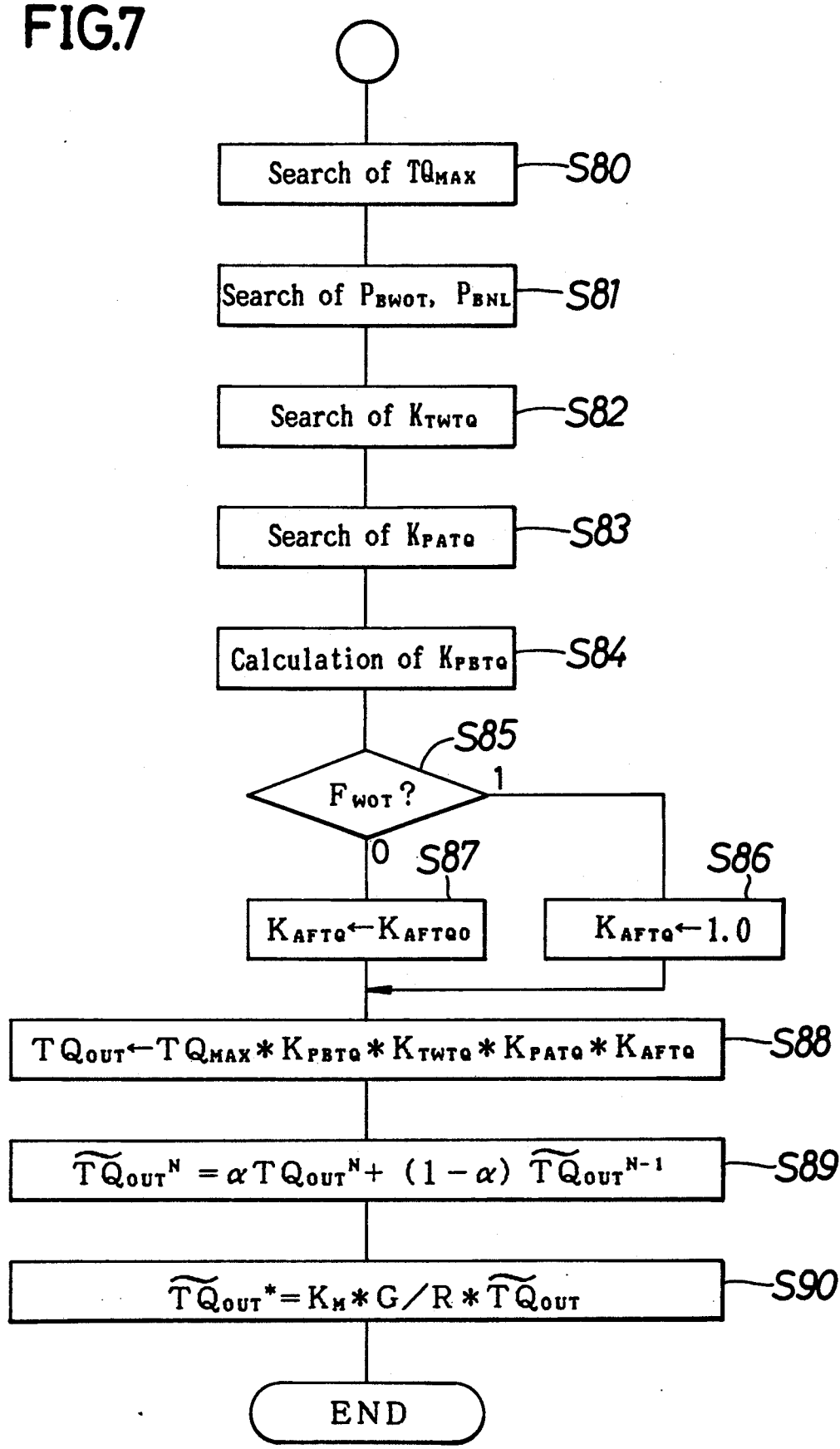

SYSTEM AND METHOD FOR CONTROLLING TORQUE OF DRIVING WHEEL

BACKGROUND OF THE INVENTION

1. Field of the Invention

The field of the present invention is systems and methods for controlling the torque of driving wheel for use in a traction control for preventing excessive slipping of the driving wheel.

2. Description of the Prior Art

In a so-called traction control system for preventing the excessive slipping of the driving wheel during starting and speed-increasing of a vehicle, there are conventionally known driving-wheel torque control means of a type in which the throttle opening degree in an internal combustion engine is controlled in a feed-back manner (for example, see Japanese Patent Application Laid-open No 7954/87). With such driving-wheel torque control system, the driving-wheel torque can be controlled so that the amount of slippage of the driving wheel becomes an appropriate value, thereby providing a proper driving force suitable to the frictional coefficient of a road surface and to the operational condition of the vehicle.

In the prior art driving-wheel torque control system, however, the last throttle opening degree or a given value is used as an initial throttle opening degree at the start of the feed-back control of the throttle opening degree. For this reason, there is a time lag until the throttle opening degree becomes a value which provides a desired slippage of the driving wheel, and hence, there is a problem in the transition response.

In addition, in the traction control, the throttle valve is controlled in a feed-back manner at the occurrence of an excessive slipping of the driving wheel to limit the output from the internal combustion engine, and if such excessive slipping has been increased to such a value that it cannot be absorbed only by the control of the throttle valve, the cutting of fuel supply is also used to further limit the output from the internal combustion engine.

In such a case, an initial throttle opening degree at a time point when the processing is returned from the fuel cutting to the feed-back control during the traction control is evaluated from the torque condition for the driving wheels to a time point when a predetermined time is elapsed after entering into the fuel cutting and hence, in some cases, the initial throttle opening degree may be evaluated as a value larger than an actually required initial opening degree because of an error due to the indefinite frictional coefficient of a road surface. In addition, when the road surface frictional coefficient is reduced in the course of after determination of an initial degree of opening of the throttle valve up to the return from the fuel cutting, the initial opening degree at the return from the fuel cutting may be too large in some cases. If the initial degree of opening of the throttle valve becomes too large by such reasons, a disadvantage is encountered that the excessive slipping of the driving wheel at the time point of return from the fuel cutting is too large to cause the reentering into the fuel cutting, so that the entering into and returning from the fuel cutting may be repeated.

In addition, in the prior art driving-wheel torque control system, a gear ratio of a transmission is not taken into consideration in finding a surplus torque required to calculate an effective driving-wheel torque and for this reason, it is impossible to find the surplus torque correctly.

The output torque from the internal combustion engine maye be varied even depending upon the air-fuel ratio in addition to the throttle opening degree and an ignition time, and further, the driving-wheel torque may be varied even depending upon the transmitting efficiency of the transmission, the gear ratio, the hydraulic pressure of a brake and the like in addition to the output torque from the internal combustion engine. Therefore, the prior art driving torque control system has another problem that when the driving wheel torque is desired to be controlled to a predetermined value in a certain operational condition by using a plurality of parameters (e.g., the throttle opening degree and the ignition time) in combination, a close control cannot be conducted unless the total amount of variation in driving wheel torque corresponding to the amount of variation in each parameter is grasped correctly.

SUMMARY OF THE INVENTION

Accordingly, it is a first object of the present invention to conduct a closer control of the torque of driving wheel by providing an appropriate initial throttle opening degree at the start of a feed-back control of the throttle opening degree to provide an optimal slipping of the driving wheel.

It is a second object of the present invention to avoid the disadvantage that the entering into the fuel cutting repeatedly occurs in a driving-wheel torque control system using the fuel cutting and feed-back control in combination.

It is a third object of the present invention to correctly find a surplus torque for calculating an effective driving-wheel torque in consideration of a gear position in reducing the output from an internal combustion engine to inhibit the excessive slipping of driving wheel.

It is a fourth object of the present invention to enable a further close control of the torque of driving wheel by converting an influence exerted to the driving-wheel torque by a variation in one of two control quantities influencing the driving-wheel torque, to an amount of variation in the other control quantity.

To achieve the above first object, according to the present invention, there is provided a system for controlling torque of a driving wheel, comprising a driving-wheel torque reducing means for reducing the output from an internal combustion engine connected to the driving wheel when an excessive slipping of the driving wheel has been detected, thereby inhibiting an excessive slipping of the driving wheel, wherein the driving-wheel torque reducing means comprises a means for finding a total driving-wheel torque transmitted from the internal combustion engine to the driving wheel, a means for finding a surplus torque consumed for the excessive slipping of the driving wheel, a means for finding an effective driving-wheel torque transmittable to road surface based on the total driving-wheel torque and the surplus torque, and a means for reducing the output from the internal combustion engine on the basis of the effective driving-wheel torque.

With the above construction, in starting the feed-back control of the throttle opening degree in the internal combustion engine to inhibit the excessive slipping of the driving wheel, an initial throttle opening degree is determined on the basis of the effective driving-wheel torque found from the total driving-wheel torque and the surplus torque. Therefore, the driving-wheel torque can be converged quickly to an optimal value, and the transition responsiveness thereof can be improved.

To achieve the first object, according to the present invention, there is also provided a system for controlling torque of a driving wheel, comprising a driving-wheel torque reducing means for reducing the output from an internal combustion engine connected to the driving wheel when an excessive slipping of the driving wheel has been detected, thereby inhibiting the excessive slipping of the driving wheel, wherein the driving-wheel torque reducing means comprises a means for finding a total driving-wheel torque transmitted from the internal combustion engine to the driving wheels, a means for finding a surplus torque consumed for the excessive slipping of the driving wheel, and a means for reducing the output from the internal combustion engine on the basis of the total driving-wheel torque and the surplus torque.

With the above construction, in starting the feed-back control of the throttle opening degree in the internal combustion engine to inhibit the excessive slipping of the driving wheel, an initial throttle opening degree is determined on the basis of the total driving-wheel torque and the surplus torque. Therefore, the driving-wheel torque can be converged quickly to an optimal value, and the transition responsiveness thereof can be improved.

To achieve the second object, according to the present invention, there is provided a system for controlling torque of a driving wheel, in which when an excessive slipping of the driving wheel has been detected, the excessive slipping is inhibited by an output reducing means for reducing the output from an internal combustion engine connected to the driving wheel, wherein the output reducing means comprises a means for driving a throttle valve to be open or closed when the excessive slipping has exceeded a first judgement value, thereby providing a feed-back control, a means for providing the cutting of a fuel on the basis of a decision that a fuel cutting condition is established when the excessive slipping has exceeded a second judgement value larger than the first judgement value, and for providing return from the fuel cutting on the basis of a decision that a fuel-cutting return condition is established when the excessive slipping has become lower than a third judgement value smaller than the second judgement value, a means for calculating a throttle feed-back initial opening degree at the return from the fuel cutting, based on a total torque transmitted from the internal combustion engine to the driving wheel and a surplus torque consumed for the excessive slipping of the driving wheel, during cutting of fuel, a means for deciding the establishment of another fuel-cutting condition when the another fuel-cutting condition has been established for a predetermined time from a time point of returning from the fuel cutting, and a means for setting the throttle feed-back initial opening degree at a time point of returning from another fuel-cutting at a level less than a throttle opening degree at a time point of entering into the another fuel-cutting.

With the above construction, when the processing enters into the another fuel-cutting within a predetermined time after returning from the fuel cutting, a throttle feed-back initial opening degree at a time point of returning again from the another fuel-cutting is set smaller than the throttle opening degree at the time point of the entering into the another fuel-cutting. This inhibits the throttle initial opening degree at the start of the feed-back control from being too large, thereby preventing the repeated occurrence of the fuel cutting.

To achieve the above third object, according to the present invention, there is provided a system for controlling torque of a driving wheel, comprising a driving-wheel torque reducing means for reducing the output from an internal combustion engine connected to the driving wheel when an excessive slippinng of the driving wheel has been detected, thereby inhibiting the excessive slipping of the driving wheel, wherein the driving-wheel torque reducing means comprises a means for finding a total driving-wheel torque transmitted from the internal combustion engine to the driving wheel, a means for finding a surplus torque consumed for an excessive slipping of the driving wheel, a means for finding an effective driving-wheel torque transmittable to a road surface based on the total driving-wheel torque and the surplus torque, and a means for reducing the output from the internal combustion engine on the basis of the effective torque, the means for finding the surplus torque being arranged to find the surplus torque from a slip-variation condition of the driving wheel and a gear position of a transmission for transmitting the output from the internal combustion engine to the driving wheel.

With the above construction, a relationship between the total driving-wheel torque and a driving-wheel slip variation rate is unconditionally determined by the gear position, and this makes it possible to find a surplus torque on the basis of the gear position and the driving wheel slip variation rate and to determine, on the basis of such surplus torque, an effective driving-wheel torque required in reducing the output from the internal combustion engine to inhibit the excessive slipping of the driving wheel. In this case, the surplus torque is calculated taking the gear position into consideration and hence, can be found more correctly.

To achieve the above fourth object, according to the present invention, there is a method for controlling torque of a driving wheel by varying first and second control qauntities influencing the driving-wheel torque, comprising converting the amount of variation in driving wheel torque produced by an amount of variation in the first control quantity to a corresponding amount of variation in the second control quantity, correcting the second control quantity by the resulting converted value for the amount of variation, and controlling the driving-wheel torque on the basis of the amount of variation in the first control quantity and of the corrected second control quantity.

With the above feature, in varying the first and second control quantities to control the driving-wheel torque, the amount of variation in driving-wheel torque produced by the variation in the first control quantity is calculated, and an amount of variation in the second control quantity suitable to produce such amount of variation in driving-wheel torque is calculated. Therefore, the two control quantities influencing the driving-wheel torque can be converted to each other and consequently, it is possible to easily and closely carry out the control of the driving-wheel torque.

The above and other objects, features and advantages of the invention will become apparent from a reading of the following description of the preferred embodiments, taken in conjunction with the accompanying drawings.

BRIEF DESCRIPTION OF THE DRAWINGS

FIG. 2 is a block diagram illustrating an electronic control unit;

FIG. 4 is a flow chart illustrating a sub-routine for determining a coefficient of feed-back control for the throttle valve;

FIG. 7 is a flow chart illustrating a sub-routine for finding a total driving-wheel torque;

DESCRIPTION OF THE PREFERRED EMBODIMENTS

The present invention will now be described by way of embodiments with reference to the accompanying drawings.

Figure 1:
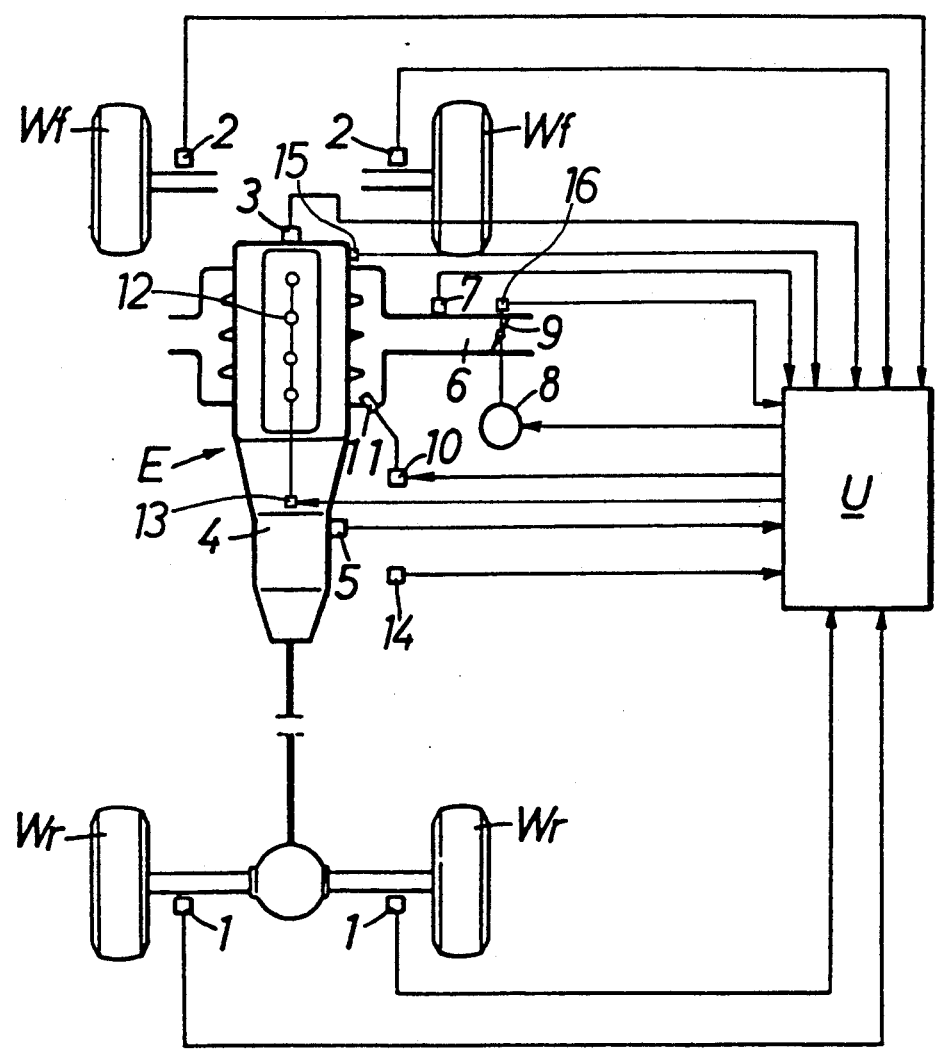
FIG. 1 is a schematic diagram illustrating the construction of a vehicle equipped with a control system according to the present invention.

FIG. 1 is a schematic diagram showing a construction of a vehicle equiped with a control system of the present invention. The vehicle comprises a pair of driving wheels Wr driven by an internal combustion engine E, and a pair of driven wheels Wf. The driving and driven wheels Wr and Wf are provided with a driving wheel speed detector 1 and a driven wheel speed detector 2 for detecting the speeds Vw and Vv of the driving and driven wheels, respectively. The internal combustion engine E is provided with a rotational speed detector 3 comprising a gear for detecting the rotational speed Ne of a crankshaft of the engine and a solenoid pick-up, and a gear position detector 5 for detecting the gear position of a transmission 4. An intake passage 6 in the internal combustion engine E is provided with an intake pipe internal pressure detector 7 for detecting the internal pressure $P_B$ in an intake pipe and a throttle valve 9 connected to a pulse motor 8 so that it can be driven for opening and closing. Further, at a downsteam end of the intake passage 6, there is a fuel injection valve 11 including a fuel cutting means 10, and an ignition time control means 13 is connected to a plug 12. Also provided in the vicinity of the internal combustion engine E are an atmospheric pressure detector 14 for detecting the atmospheric pressure $P_A$, a water-temperature detector 15 for detecting the temperature of a cooling water, and a throttle opening degree detector 16. Connected to an electronic control unit U are the driving wheel speed detector 1, the driven wheel speed detector 2, the rotational speed detector 3, the gear-position detector 5, the intake pipe internal pressure detector 7, the pulse motor 8, the fuel cutting means 10, the ignition time control means 13, the atmospheric pressure detector 14, the water-temperature detector 15 and the throttle opening degree detector 16.

FIG. 2 illustrates the electronic control unit U for calculating detection signals received thereinto from the above-described detectors on the basis of a control program to drive the pulse motor 8, the fuel cutting means 10 and the ignition time control means 13. The electronic control unit U is comprised of a central processing unit (CPU) 17 for providing the above-described calculation, a read only memory (ROM) 18 having data of the control program and various maps stored therein, a random access memory (RAM) 19 which temporarily stores the detection signals from the detectors and calculation results therein, an input section 20 to which are connected the above-described detectors, i.e., the driving wheel speed detector 1, the driven wheel speed detector 2, the rotational speed detector 3, the gear-position detector 5, the intake pipe internal pressure detector 7, the atmospheric pressure detector 14, the water-temperature detector 15 and the throttle opening degree detector 16, and an output section 21 to which are connected the pulse motor 8, the fuel cutting means 10, and the ignition time control means 13. The electronic control unit U calculates on the basis of a control program which will be described hereinafter the detection signals received through the input section 20 and data or the like stored in the read only memory 18 in the central processing unit 17 and finally drives the pulse motor 8, the fuel cutting means 10 and the ignition time control means 13 via the output section 21. This causes the output torque of the internal combustion engine E to be varied, with the result that the driving wheel torque is controlled to an optimal value to inhibit the excessive slipping of the driving wheels Wr.

The following is a description of the details of the control of the driving wheel torque carried out in the electronic control unit U in connection to flow charts in FIGS. 3 to 9.

FIGS. 3A to 3D illustrate routines for a throttle feed-back control for reducing the output torque from the internal combustion engine E. First, it is decided at a step S1 whether or not a fuel cutting flag $F_{F/C}$ determined in a fuel cutting sub-routine (see FIGS. 8A and 8B) which will be described hereinafter has been set. At a step S2, it is decided whether or not the rotational speed Ne of the internal combustion engine E is less than 1,500 RPM, on the basis of the detection signal from the rotational speed detector 3. During cutting of a fuel and if Ne ≥ 1,500 RPM, an initial throttle opening degree $\theta_{THINIT}$ for the throttle feed-back control is determined at a step S3. In other cases, the processing is advanced to a step S4. It should be noted that the fuel cutting is conducted when the slippage $V_E$ of the driving wheels, i.e., a difference resulting from subtraction of, from the driving wheel speed Vw delivered from the driving wheel speed detector 1, a reference speed $V_{RP}$ as a first judgement value which is a function of the driven wheel speed Vv delivered from the driven wheel speed detector 2, is sufficiently large, and when it has been decided that the driving wheels Wr are slipping excessively. Here, the above-described $V_E$ and $V_{RP}$ are represented by the following expressions:

$$V_E = V_W - V_{RP}$$

$$V_{RP} = F(V_V) = K \cdot V_V$$

wherein K is a constant (K>1.0).

During cutting of fuel and when a condition, Ne>1,500 RPM is not established, a throttle feed-back cycle which is a function of the rotational speed Ne of the internal combustion engine E is searched on the basis of a map at a step S4. If it has been decided at a subsequent step S5 that the processing is a feed-back cycle, control gains $K_{THP}^*$, $K_{THI}^*$ and $K_{THD}^*$ thereof are determined at a step S6 to effect a PID feed-back control for the throttle opening degree.

A sub-routine for the step S6 will be described below in connection to FIG. 4. First, at a step S56, respective control gains $K_{THP}$, $K_{THI}$ and $K_{THD}$ in P, I and D items depending upon the magnitude of an acceleration Tg of a vehicle body are searched from a table stored in the read only memory 18 in the electronic control unit U. The acceleration Tg of the vehicle body is found as a vectorial sum of accelerations: a lateral acceleration calculated on the basis of a yaw rate obtained from a deviation between the left and right driven wheel speeds Vv detected by the driven wheel speed detector 2; and a longitudinal acceleration obtained by differentiating calculation of the driven wheel speeds Vv, and a coefficient of friction between a road surface and a tire is evaluated in accordance with the magnitude of the acceleration Tg of the vehicle body. More specifically, the detection of a larger acceleration of the vehicle body is when the torque of the driving wheels Wr is transmitted to the road surface without consumption for slipping. In such an event, it is assumed that the frictional coefficient of the road surface is larger. Conversely, the detection of a smaller acceleration of the vehicle body is when many of the torque of the driving wheels Wr is consumed for slipping, but is not transmitted to the road surface. In such an event, it is assumed that the frictional coefficient is smaller. In general, when the acceleration Tg of the vehicle body is larger (i.e., when the frictional coefficient of a road surface is larger), the engine torque is used primarily for increasing the speed of the vehicle rather than consumed for increasing of the speed of the driving wheels. For this reason, the variation in slippage of the driving wheel against the unit variation in throttle opening degree may be reduced to provide a reduced responsive rate of the feed back, resulting in a need for increasing the feed-back gain. On the other hand, when the acceleration Tg of the vehicle body is smaller (i.e., when the frictional coefficient of a road surface is larger), the engine torque is consumed primarily for slipping of the driving wheel. For this reason, the variation in slippage of the driving wheel against the unit variation in throttle opening degree may be increased to provide an increased responsive rate of the feed back, resulting in a need for reducing the feed-back gain. Thus, the control gains $K_{THP}$, $K_{THI}$ and $K_{THD}$ are set so that they are increased when the acceleration Tg of the vehicle body is larger (see FIG. 9).

Figure 10:
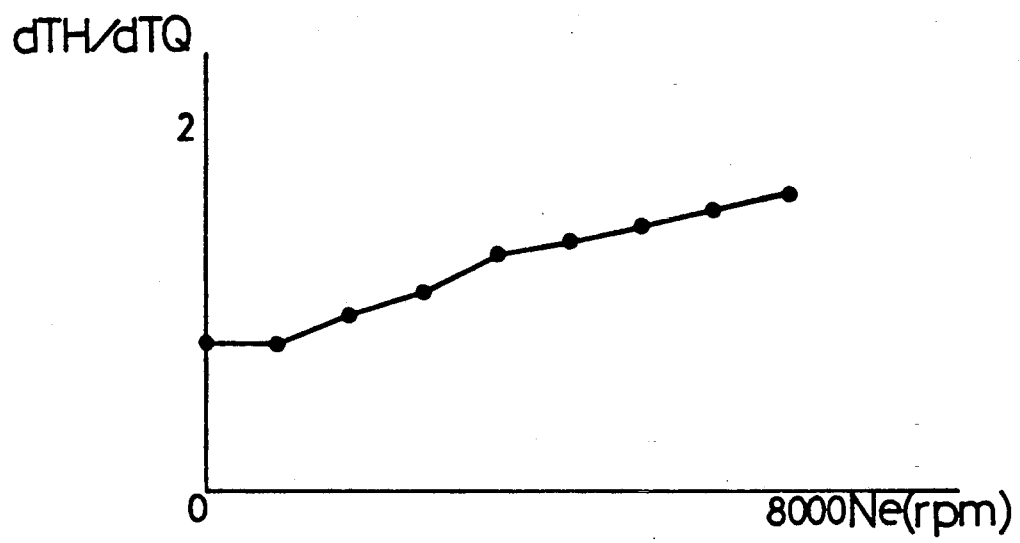
FIG. 10 is a graph illustrating a characteristic of correcting factor $dTH/dTQ$.

Then, a correcting factor dTH/dTQ for the engine torque relative to the throttle opening degree is searched at a step S57 on the basis of the rotational speed Ne of the internal combustion engine E delivered from the rotational speed detector 3 (see FIG. 10). This correction is conducted to make constant a decrement of the driving wheel torque relative to the variation in throttle opening degree, in view of the fact that the variation in engine output occuring upon changing of the opening degree of the throttle valve 9 by a unit angle with increasing of the rotational speed Ne of the internal combustion engine E is changed.

Figure 11:
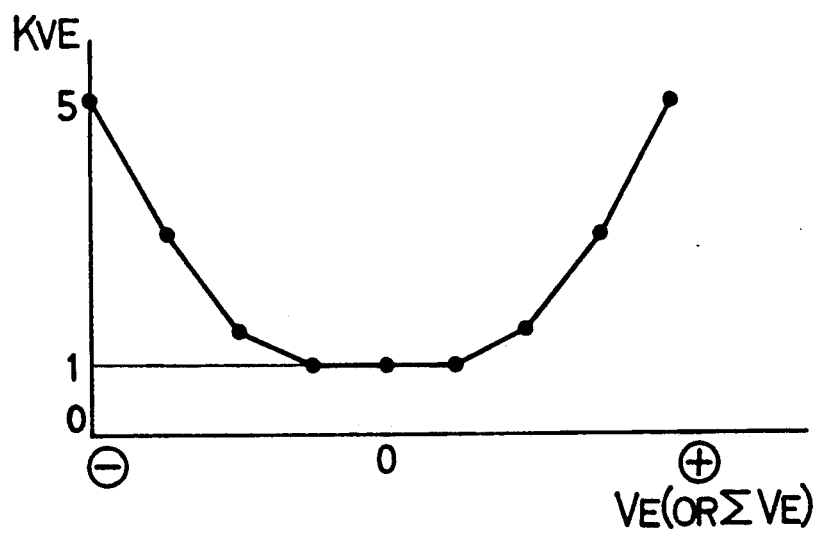
FIG. 11 is a graph illustrating a characteristic of correcting factor $K_{VE}$.
Figure 12:
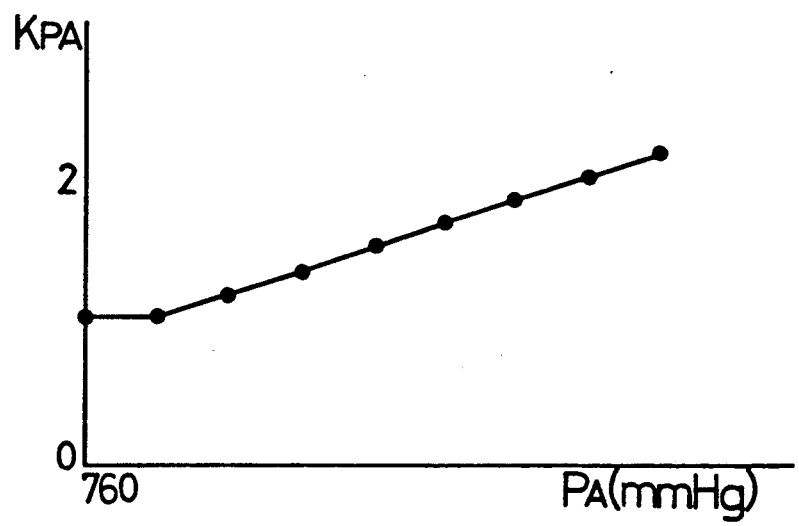
FIG. 12 is a graph illustrating a characteristic of correcting factor $K_{PA}$.

Subsequently, at a step S58, a gear-position correcting factor $K_{G/R}$ for correcting the variation in driving wheel torque by a gear ratio G/R is searched from the table on the basis of an output signal from the gear-position detector 5. Then, a $V_E$ correcting factor $K_{VE}$ is searched at a step S59 on the basis of a deviation $V_E$ (or $\Sigma V_E$) between an actual driving wheel speed $V_W$ and a desired driving wheel speed $V_R$ (see FIG. 11). The $V_E$ correcting factor $K_{VE}$ functions to correct the control gain in a case where a necessary and sufficient acceleration of the vehicle body is not obtained, such as a case where a desirable initial output torque from the internal combustion engine E at the start of the feed-back control is not obtained, a case where the frictional coefficient of the road surface is suddenly increased, and so on. As can be seen from FIG. 12, the correcting factor $K_{VE}$ has a dead zone where $K_{VE}=1$ in a predetermined range of $V_E$ (or $\Sigma V_E$). This ensures that a hunting is prevented from being produced. Then, at a step S60, an atmospheric pressure correcting factor $K_{PAFB}$ for correcting the engine torque due to the atmospheric pressure is searched from the table on the basis of an output signal from the atmospheric pressure detector 14 (see FIG. 12).

Figure 13:
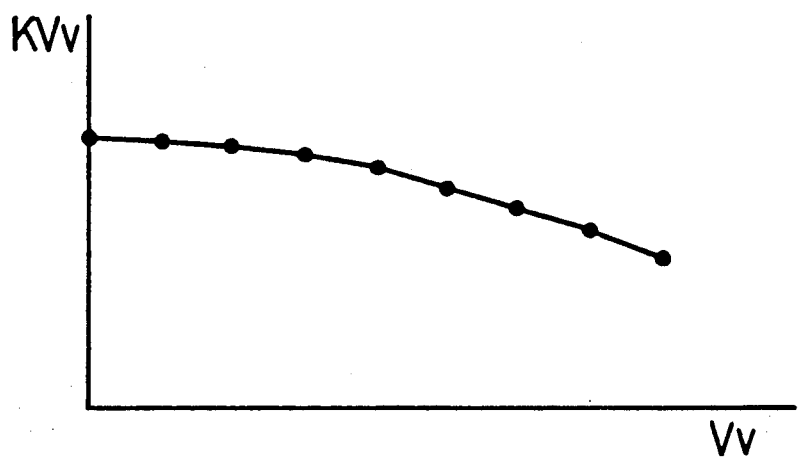
FIG. 13 is a graph illustrating a characteristic of correcting factor $K_{VV}$.

Finally, at step S61, a vehicle speed correcting factor $K_{VV}$ is searched from the table on the basis of a driven wheel speed Vv delivered by the driven wheel speed detector 2 (see FIG. 13). As apparent from FIG. 13, the vehicle speed correcting factor $K_{VV}$ is set so that it decreases as the driven wheel speed Vv, i.e., the vehicle speed increases, and it functions to reduce the control gains $K_{THP}$, $K_{THI}$ and $K_{THD}$ to enhance the convergence of the driving wheel speeds Vw, when the vehicle speed is at a high level where the coefficient of frictional between a tire and a road surface tends to decrease. Particularly, the vehicle speed correcting factor $K_{VV}$ is set so that it further decreases when the sensor detects the fact that the road surface is wet due to a rainy weather or the like, i.e., when the reduction in road surface frictional coefficient at a high vehicle speed is large. The setting (see the step S56) of the gains on the basis of the acceleration Tg of the vehicle body is a feed-back type factor, so that the road surface frictional coefficient can be assumed only after the acceleration of the vehicle body has been actually detected. By contrast, the correction of the gains on the basis of the driven wheel speeds Vv is a feed-forward type factor premised on an assumption that the road surface frictional coefficient may be reduced at a high vehicle speed. Therefore, the road surface frictional coefficient can be assumed without any time lag and reflected quickly to the control gains $K_{THP}$, $K_{THI}$ and $K_{THD}$.

Control gains $K_{THP}^*$, $K_{THI}^*$ and $K_{THD}^*$ finally corrected using the correcting factors are calculated at a step S62.

Returning to FIGS. 3A and 3B, it is decided at a step S7 whether or not the last throttle feed-back is being conducted. If YES, i.e., if the throttle feed-back is in continuation, the I item: $\theta_{THFBI}^N$ is calculated at a step S8 according to the following expression:

$$\theta_{THFBI}^N = \theta_{THFBI}^{N-1} - K_{THI}^{N*} \cdot V_E$$

Here, the reason why the sign of a second item on a right side in the above expression is negative is that $V_E$ takes a value larger than zero in a positive side. On the other hand, if NO at the step S7, i.e., if the processing is newly brought into the throttle feed-back, the setting of an initial throttle opening degree is conducted in the following manner. At a step S9, it is decided whether or not the fuel cutting has been conducted last time. If YES, i.e., if the processing is returned from the fuel cutting, the initial throttle opening degree $\theta_{THINIT}$ at a time point of return from the fuel cutting which will be described hereinafter is replaced by $\theta_{THFBI}^O$ at a step S10. Alternatively, if a fuel cutting has been newly conducted, the previously provided initial throttle opening degree $\overline{\theta_{TH}}$ is replaced by $\theta_{THFBI}^O$ at a step S11.

Figure 14:
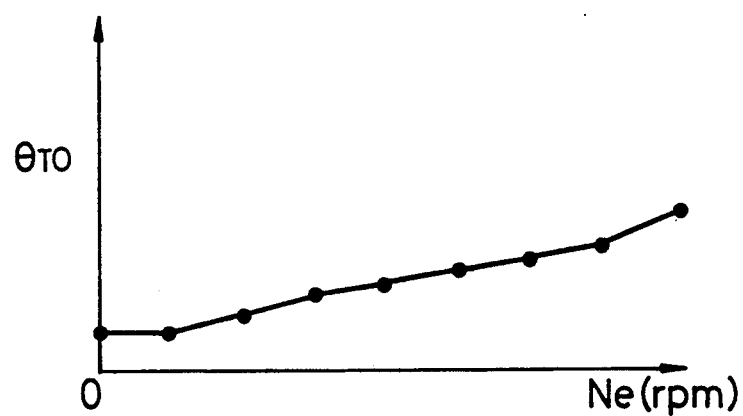
FIG. 14 is a graph illustrating a characteristic of throttle opening degree $\theta_{TO}$.
Figure 15:
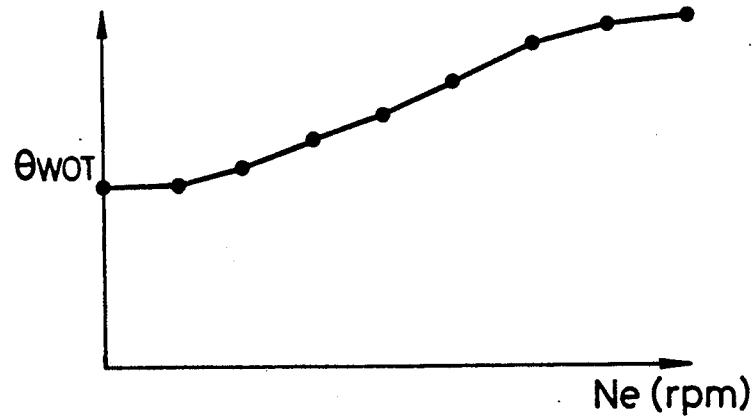
FIG. 15 is a graph illustrating a characteristic of throttle opening degree $\theta_{WOT}$.

Limiting processes for difining lower and upper limit values of $\theta_{THFBI}$ are conducted at subsequent steps S12 to S18. More specifically, a throttle opening degree $\theta_{TO}$ (see FIG. 14) corresponding to a friction amount in the internal combustion engine E is searched from the table on the basis of the rotational speed Ne, and a corrected throttle opening degree $\theta_{TO}^*$ is found by multiplying such throttle opening degree $\theta_{TO}^*$ by the above-described atmospheric pressure correcting factor (see FIG. 12). Then, it is decided at a step S12 whether or not the throttle opening degree $\theta_{TO}^*$ is larger than a dashboard opening degree $\theta_{MIN}$. The limiting processes are conducted at the steps S13 and S14, so that the $\theta_{THFBI}$ is equal to or larger than the $\theta_{MIN}$ whenever the $\theta_{MIN}$ is larger than the $\theta_{TO}^*$. The limitting processes are also conducted at the steps S15 and S16, so that the $\theta_{THFBI}$ is equal to or larger than the $\theta_{TO}^*$ whenever the throttle opening degree $\theta_{TO}^*$ is equal to or larger than the dashboard opening degree $\theta_{MIN}$. If the lower limit is defined at the steps S12 to S16 in the above manner, a throttle opening degree $\theta_{WOT}$ (see FIG. 15) corresponding to, for example, 80% of a throttle opening degree which permits the maximum torque to be produced by the internal combustion engine E is searched from the table on the basis of the rotational speed Ne in order to define the upper limit of the $\theta_{THFBI}$. If a corrected throttle opening degree $\theta_{WOT}^*$ is then found by multiplying such throttle opening degree $\theta_{TO}$ by the above-described atmospheric pressure correcting factor (see FIG. 12), the limitting processes for the upper limit are conducted at subsequent steps S17 and S18, so that the $\theta_{THFBI}$ is always equal to or less than the throttle opening degree $\theta_{WOT}^*$.

By limiting the magnitude of the $\theta_{THFBI}$ to a range between the lower limit value $\theta_{TO}^*$ (or the $\theta_{MIN}$) and the upper limit value $\theta_{WOT}^*$, it is possible to prevent the generation of any larger torque unnecessary for a traction control and to prevent the engine stalling, resulting in an improved responsibility of the control. Moreover, the lower limit value $\theta_{TO}^*$ and the upper limit value $\theta_{WOT}^*$ are set as functions of the rotational speed Ne of the internal combustion engine E and the atmospheric pressure Pa and therefore, it is possible to provide an appropriate value $\theta_{THFBI}$ over wider ranges of the rotational speed Ne and the atmospheric pressure Pa.

Then, at a step S19, a P item, $\theta_{THFBP}^N$ is calculated according to the following expression:

$$\theta_{THFBP}^N = K_{THP}^{**} \cdot V_E$$

and further, a D item, $\theta_{THFBD}^N$ is calculated according to the following expression:

$$\theta_{THFBD}^N = K_{THD}^* \cdot \dot{V}_E$$

Figure 3A:
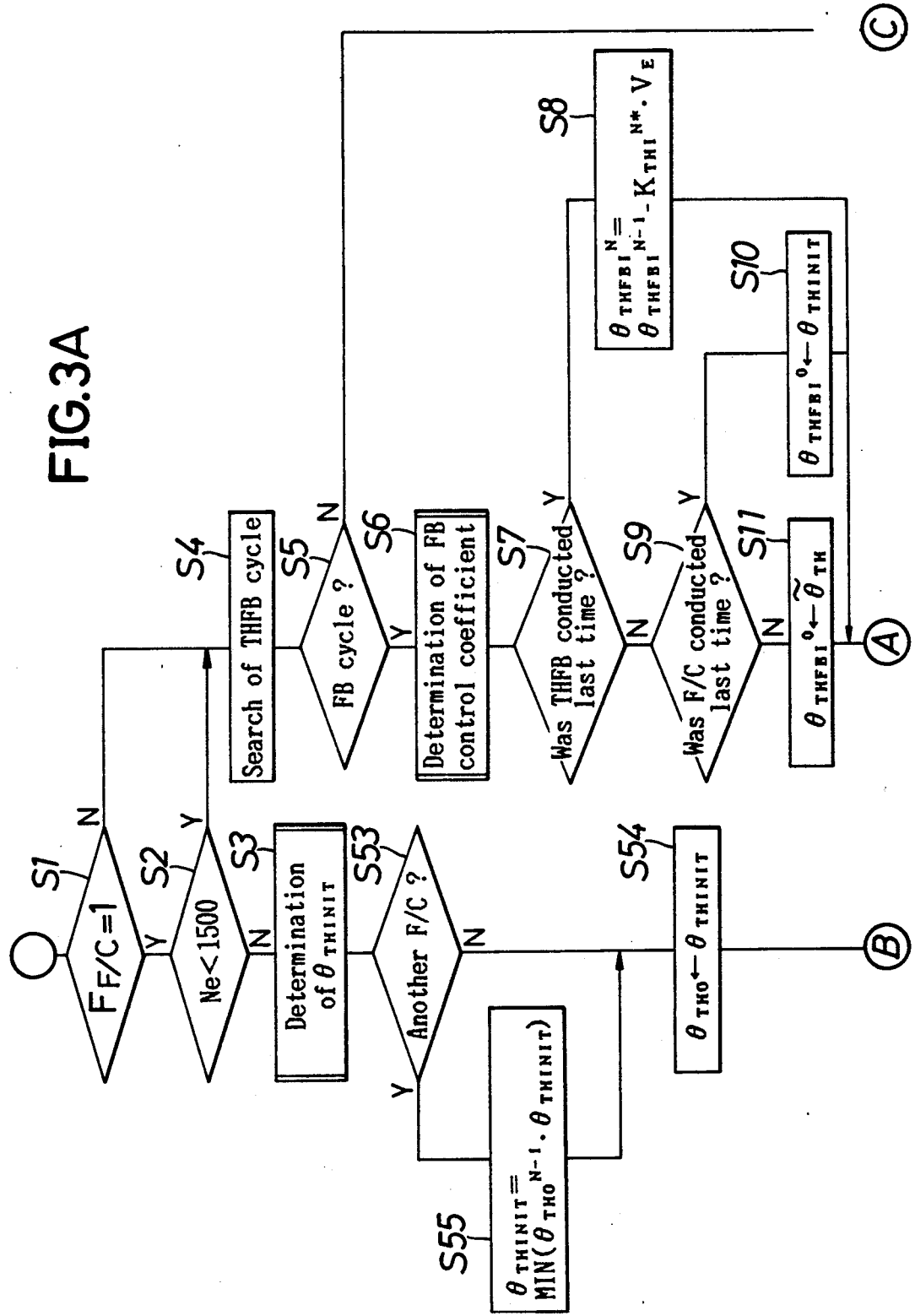
FIGS. 3A to 3D are flow charts illustrating sub-routines of a feed-back for a throttle valve.
Figure 3B:
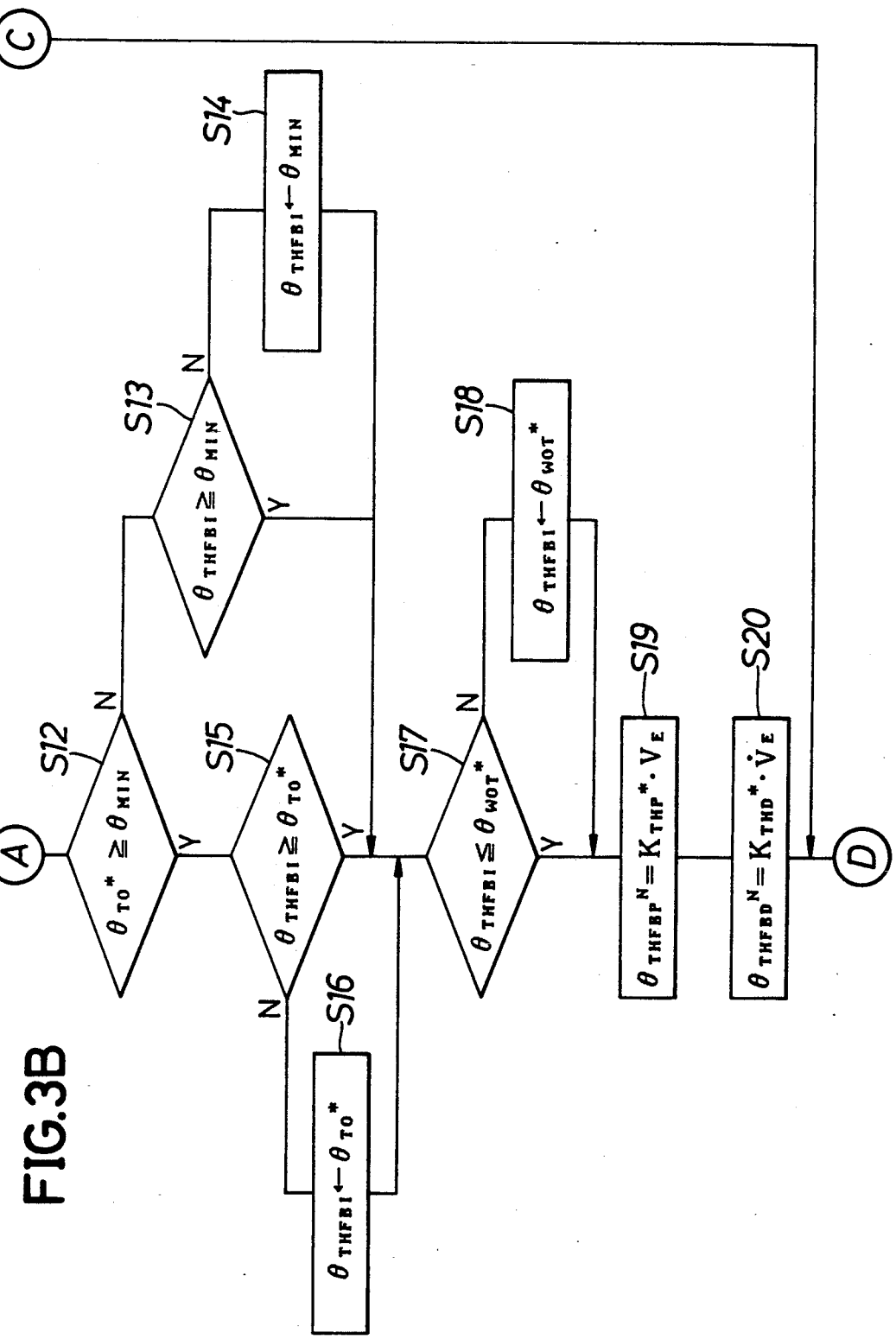
Figure 3C:
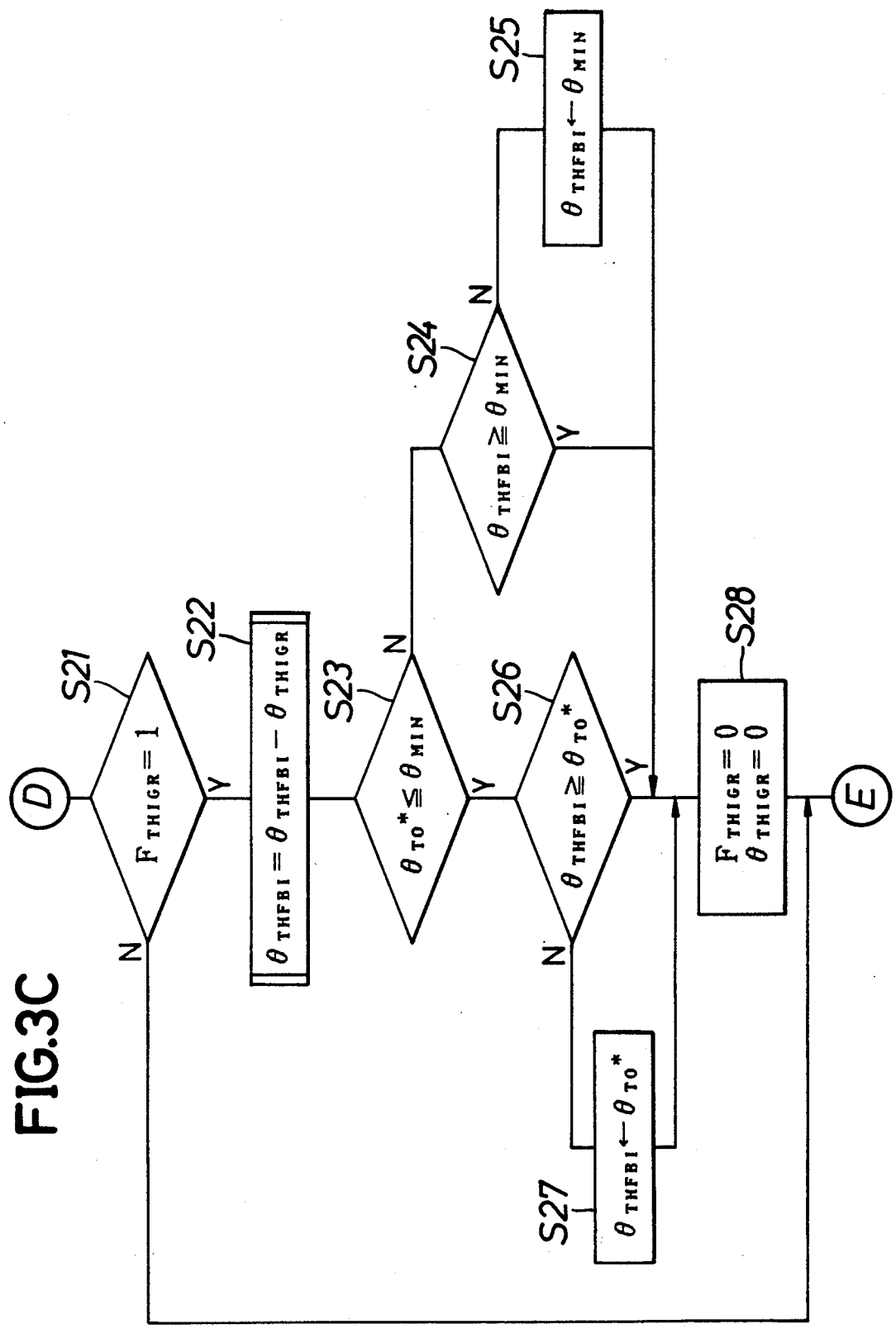
Figure 3D:
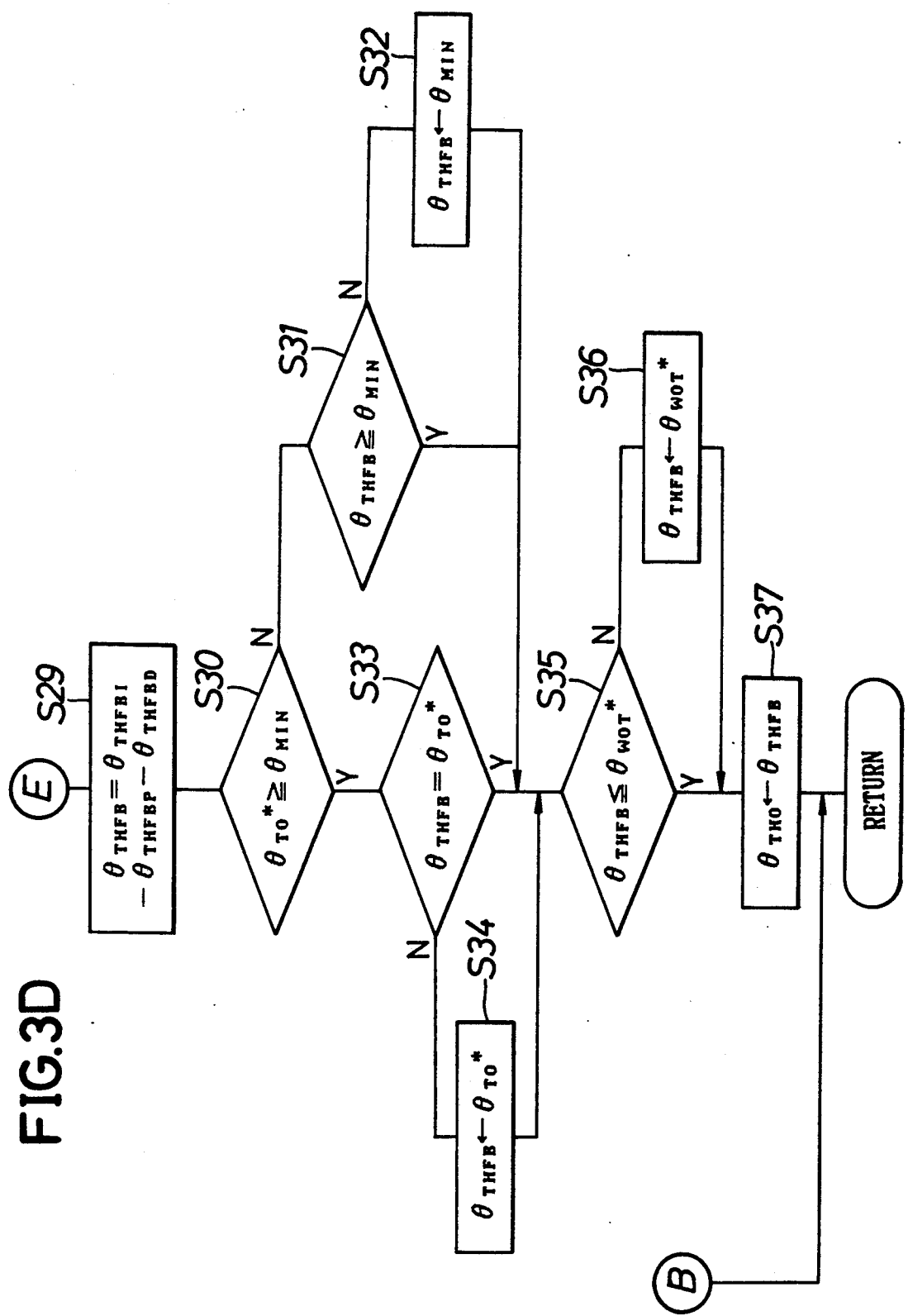
Figure 5:
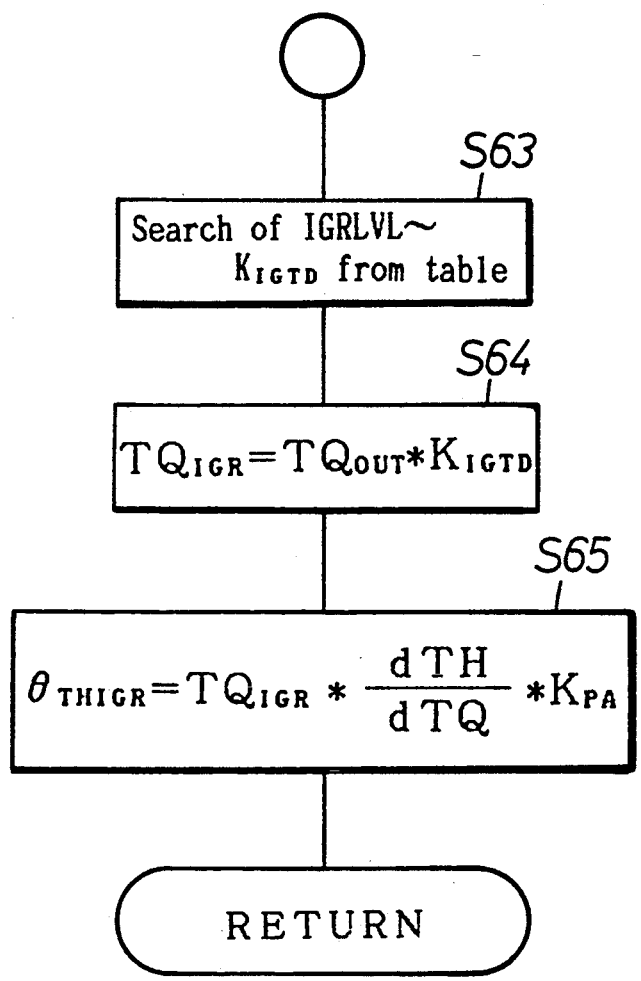
FIG. 5 is a flow chart illustrating a sub-routine for converting an ignition retard amount to an amount of variation in throttle opening degree.

Steps S21 to S28 in a flow chart shown in FIGS. 3C and 3D subsequent to FIGS. 3A and 3B are conducted when an ignition retard is also used auxiliarily to reduce the output from the internal combustion engine E. The control subjects have characteristics in responsibility of control, specific fuel consumption, emission, driveability and the like and hence, it is desirable to use a plurality of controls in a given combination in accordance with the operational condition rather than using a certain control subject alone. For example, the throttle control permits a wider range of variation in torque, but has a lower control responsibility. By contrast, the in-gintion time control permits a narrower range of variation of the torque, but has a higher control responsibility, because it may bring about a knocking and a misfiring.

First, if an ignition retard flag $F_{THIGR}$ is established at a step S21, the I item, $\theta_{THFBI}$ is corrected at the step S22 by a conversion value $\theta_{THIGR}$ resulting from the conversion of an ignition retard amount to a throttle opening degree. More specifically, when the reduction of the output from the internal combustion engine E is conducted by use of the control of the throttle valve 9 and the ignition retard in combination, the output torque from the internal combustion engine E varies depending upon both of the ignition time which is a first parameter and the throttle opening degree which is a second parameter and hence, it is necessary to know in detail the influence exerted to the output from the internal combustion engine E by variations of the both parameters. For this purpose, it is necessary to interconvert the ignition retard amount for reducing the output torque from the internal combustion engine E by a predetermined value and the amount of variation in throttle opening degree required to cause the same reduction in output.

In connection to a flow chart in FIG. 6 which is a sub-routine of the step S22 in FIGS. 3C and 3D, detailed description will now be made of a method for converting the ignition time retard amount IGRLVL which is a first parameter to the amount of variation in throttle opening degree $\theta_{THIGR}$ which is a second parameter.

First, at a step S63, an ignition retard correcting factor $K_{IGTD}$ for providing a rate of reduction in output torque from the internal combustion engine E, which corresponds to the ignition retard amount IGRLVL, is searched from the read only memory 18. The ignition retard correcting factor $K_{IGTD}$ is provided as 0.1, 0.2 and 0.3, for example, when the ignition retard amount IGRLVL is 10°, 20° and 30°, respectively. Then, at a step S64, an output torque $TQ_{OUT}$ from the internal combustion engine E prior to retard is multiplied by the above-described ignition retard correcting factor $K_{IGTD}$, thereby calculating an amount of variation in torque due to the ignition retard. In this case, the output torque $TQ_{OUT}$ from the internal combustion engine E prior to retard is calculated from a power performance curve, for example, as a function of the rotational speed Ne of the internal combustion engine E delivered by the rotational speed detector 3 and the internal pressure $P_E$ in the intake pipe delivered by the intake pipe internal pressure detector 7, as described hereinafter. Then, at a step S65, an amount of variation in throttle opening degree $\theta_{THIGR}$ for producing the amount of variation in torque $TQ_{IGR}$ is calculated by multiplying such amount of variation in torque $TQ_{IGR}$ by dTH/dTQ (see FIG. 10) indicating a variation in throttle opening degree required to provide unit variation in torque by the crank shaft and by an atmospheric pressure correcting factor $K_{PA}$ (see FIG. 12).

Thus, the ignition retard amount IGRLVL for providing a predetermined amount of variation in torque $TQ_{IGR}$ to the internal combustion engine E is converted to the amount of variation in throttle opening degree $\theta_{THIGR}$. Therefore, in controlling the output torque from the internal combustion engine E in order to inhibit the excessive slipping of the driving wheels Wr on the basis of the both parameters of ignition time and throttle opening degree, the influence exerted to the output torque from the internal combustion engine by the both parameters is grasped correctly, ensuring that the control of driving wheel torque can be conducted closely and easily.

Returning to the steps S23 to S27 shown in FIGS. 3C and 3D, the lower limit of the $\theta_{THFBI}$ after correction is limited to either larger one of the throttle opening degree $\theta_{TO}*$ corresponding to the friction amount in the internal combustion engine E and the dashpot opening degree $\theta_{MIN}$ by the same limitting process as at the steps S12 to S16 and thereafter, at a step S28, the ignition retard flag $F_{THIGR}$ and the conversion value $\theta_{THIGR}$ are brought into zero.

If a feed-back control quantity $\theta_{THFB}$ is then calculated at a step S29 according to the following expression:

$$\theta_{THFB} = \theta_{THFBI} - \theta_{THFBP} - \theta_{THFBD}$$

wherein the reason why the sign of second and third items on a right side in the above expression is negative is that the $V_E$ has a value larger than zero on a positive side likewise as described above, the same limitting processes as at the steps S12 to S18 are conducted at the following steps S30 to S36, whereby lower and uper limits of the feed-back control quantity $\theta_{THFB}$ are provided.

At a step S37, the feed-back control quantity $\theta_{THFB}$ is brought into a desired throttle opening degree $\theta_{THO}$, so that the pulse motor 8 is driven to open or close the throttle valve 9.

Figure 6A:
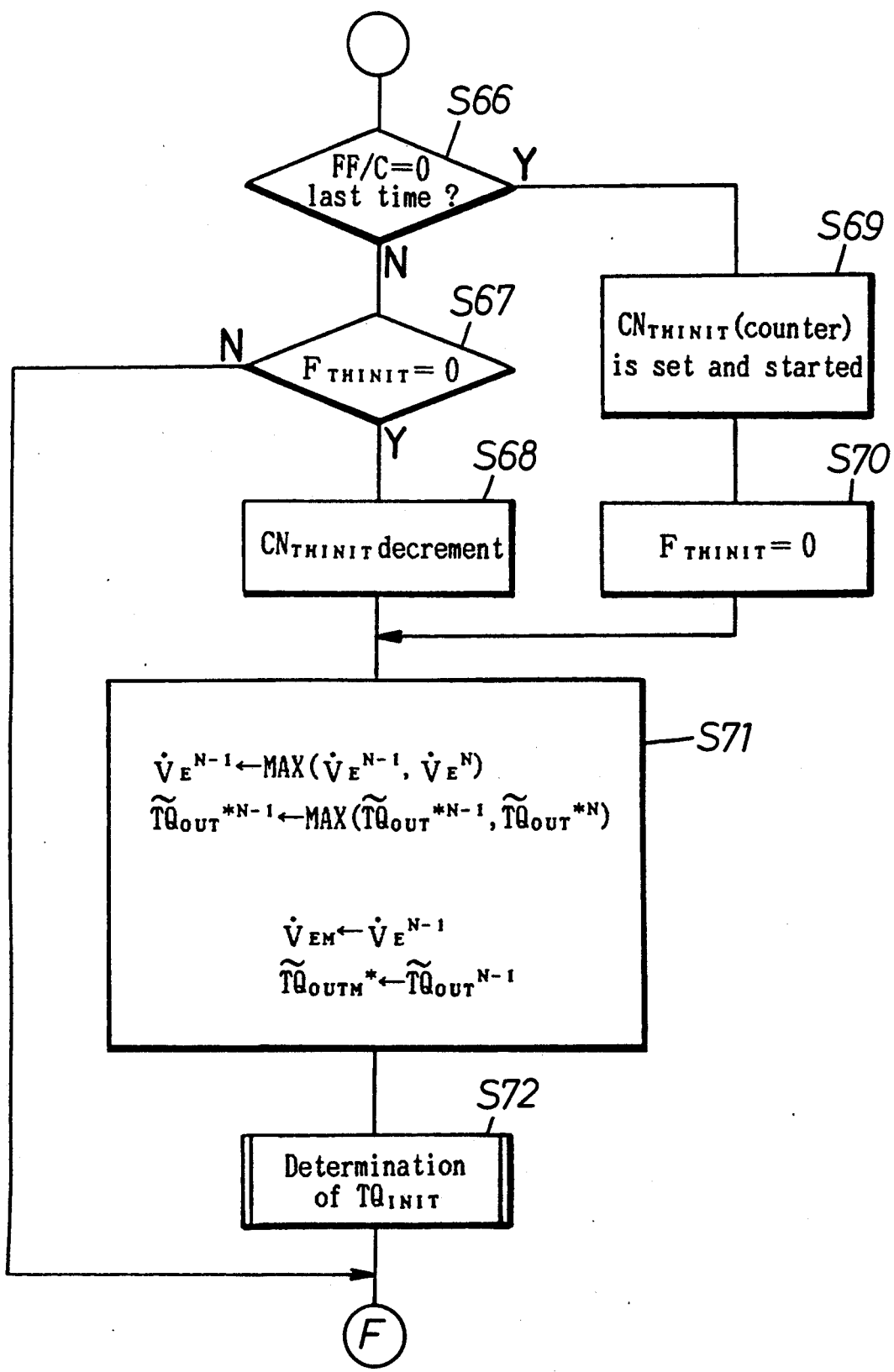
FIGS. 6A and 6B are flow charts illustrating a sub-routine for finding an initial throttle opening degree in the feed back for the throttle valve.
Figure 6B:
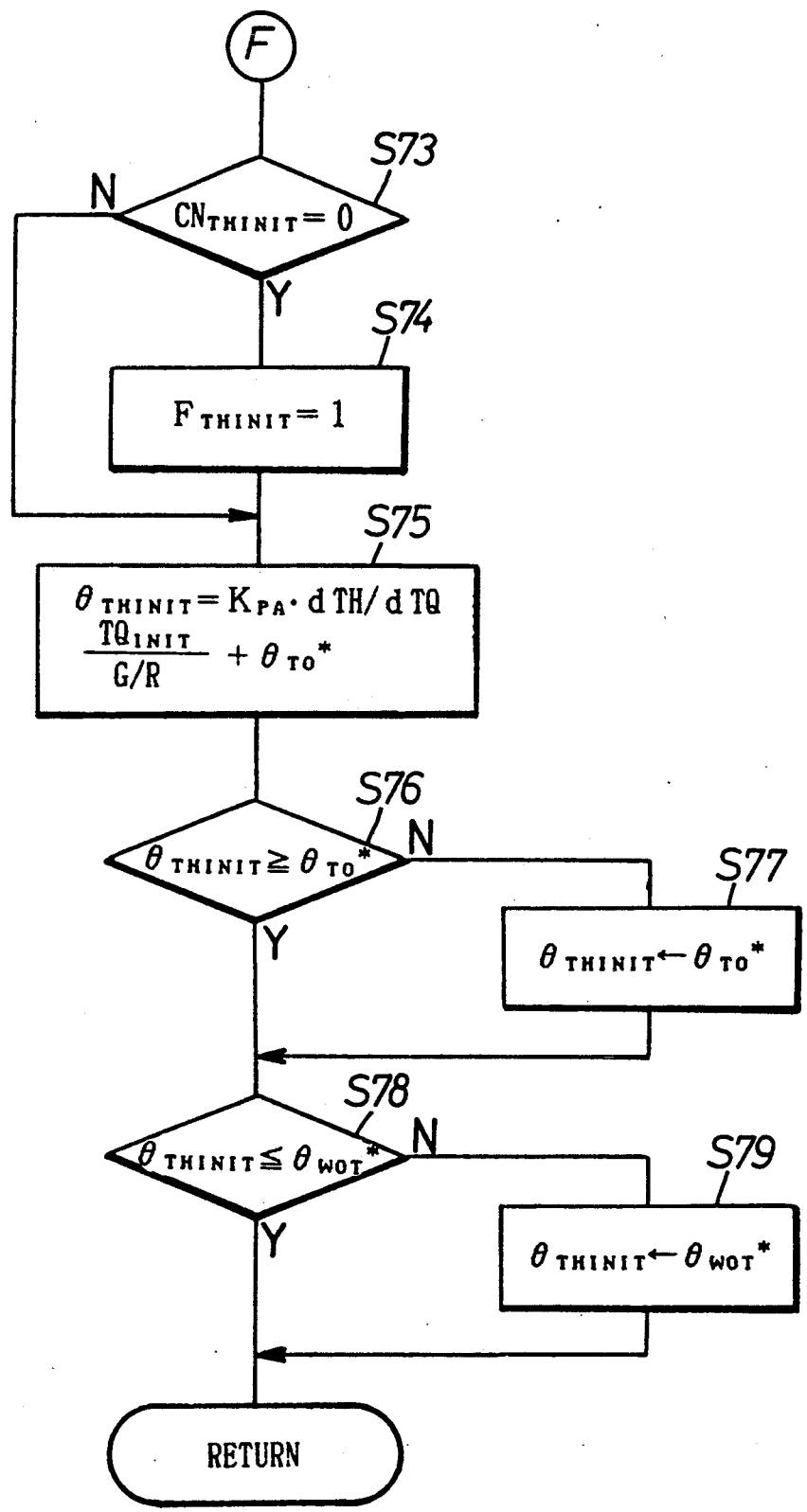

During fuel-cutting at the steps S1 and S2 in FIGS. 3A and 3B and if the condition, $Ne \geq 1,500$ RPM is established, a sub-routine of the step S3, i.e., shown in flow charts of FIGS. 6A and 6B is carried out by interruption of 10 ms. First, at a step S66, it is decided whether or not the last fuel cutting flag $F_{F/C}$ is zero. If NO, i.e., if in fuel-cutting, it is further decided at a step S67 whether or not a throttle initializing flag $F_{THINIT}$ is zero. If YES, a throttle initializing counter $CN_{THINIT}$ is decremented at a step S68. If NO, the processing is passed to a step S73 which will be described hereinafter. Alternatively, if the fuel cutting flag $F_{F/C}$ has been decided at the step S66 to be zero, i.e., if in a condition immediately after entering into the fuel-cutting, the throttle initializing counter $CN_{THINIT}$ is set at 100 ms at a step S69 and started. At a subsequent step S70, the throttle initializing flag $F_{THINIT}$ is reset at zero.

At a step S71, there are found the maximum value $V_{EM}$ of the driving-wheel slip variation rate values $\dot{V}_E$ for the past 100 ms, and the maximum value $\hat{TQ}_{OUTM}*$ of the total driving-wheel torque values $\hat{TQ}_{OUT}*$ for the past 100 ms, which have been probably generated in a condition in which the fuel is not cut.

In a flow chart of FIG. 7 which is a sub-routine for finding the total driving-wheel torque $\hat{TQ}_{OUT}*$, the maximum crankshaft torque $TQ_{MAX}$ during full opening of the throttle is searched in correspondence to the current rotational speed Ne of the internal combustion engine E at a step S80. Then, an intake pipe internal pressure $P_{BWOT}$ during full opening of the throttle and an intake pipe internal pressure $P_{BNL}$ during no loading are searched in correspondence to the rotational speed Ne of the internal combustion engine E at a step S81. At a step S82, a water-temperature correcting factor $K_{TWTQ}$ is searched from the table on the basis of the output signal from the water-temperature detector 15, and at a step S 83, an atmospheric pressure correcting factor $K_{PATQ}$ is searched from the table on the basis of the output signal from the atmospheric pressure detector 14. At a step S84, an intake pipe internal pressure correcting factor $K_{PBTQ}$ is calculated according to the following linear interpolation expression from the intake pipe internal pressure $P_{BWOT}$ during full opening of the throttle and the intake pipe internal pressure $P_{BNL}$ during no loading which have been searched at the step S81 and from the now intake pipe internal pressure $P_B$:

$$K_{PBTQ} = (P_B - P_{BNL})/(P_{BWOT} - P_{BNL})$$

Then, at a step S85, it is decided whether or not an air-fuel ratio flag $F_{WOT}$ has been established. If the air-fuel ratio flag $F_{WOT}$ has been set, i.e., when in a normal operational condition, 1 (one) is selected as an air-fuel ratio correcting factor $K_{AFTQ}$ at a step S86. If the air-fuel ratio flag has not been established, i.e., when in a lower negative load condition, a predetermined value $K_{AFTQO}$ (0.9) is selected as the air-fuel ratio correcting factor $K_{AFTQ}$ at a step S87. Then, at a step S88, a crankshaft torque corresponding to the current intake pipe internal pressure $P_B$ is calculated by multiplying the maximum crankshaft torque $TQ_{MAX}$ searched at the step S80 by the intake pipe internal pressure correcting factor $K_{PBTQ}$ calculated at the step S84, and the result is multiplied by the water-temperature correcting factor $K_{TWTQ}$ searched at the step S82, the atmospheric pressure correcting factor $K_{PATQ}$ searched at the step S83, and the air-fuel ratio correcting factor $K_{AFTQ}$ selected at the step S86 or S87, thereby evaluating the current crankshaft torque $TQ_{OUT}$. Alternatively, in place of using the intake pipe internal pressure $P_{BWOT}$ during full opening of the throttle and the intake pipe internal pressure $P_{BNL}$ during no loading to evaluate the crankshaft torque $TQ_{OUT}$, the maximum crankshaft torque $TQ_{MAX}$ can be evaluated according to the linear interpolation expression from the amounts of fuel injected during full opening of the throttle and during idling.

The crankshaft torque $TQ_{OUT}$ is evaluated in the above manner, but a somewhat time lag is generated, because a lot of time is taken until the air detected in the intake pipe internal pressure detector 7 is drawn into the internal combustion engine E and compressed and exploded from a time point when the operational condition of the internal combustion engine E is changed to a time point when the crankshaft torque $TQ_{OUT}$ is actually changed. For this reason, at a subsequent step S89, the crankshaft torque $TQ_{OUT}$ is subjected to a filtering treatment with a primary lag according to the following expression:

$$\widetilde{TQ}_{OUT}{}^N = \alpha \cdot TQ_{OUT}{}^N + (1-\alpha) \cdot \widetilde{TQ}_{OUT}{}^{N-1}$$

wherein $0 < \alpha < 1$.

The error due to the above-described time lag is absorbed by the filtering, and even for a transition period, a precise crankshaft torque $\widetilde{TQ}_{OUT}$ at each moment can be evaluated.

Then, at a step S90, a total driving-wheel torque $\widetilde{TQ}_{OUT}{}^*$ is calculated from the following expression by multiplying the crankshaft torque $\widetilde{TQ}_{OUT}{}^N$ obtained through the filtering by a mission transmitting coefficient $K_M$ and a gear ratio G/R found in corespondence to the output signal from the gear-position detector 5.

$$\widetilde{TQ}_{OUT}{}^* = K_M \cdot G/R \cdot \widetilde{TQ}_{OUT}$$

Returning to the step S71 in FIGS. 6A and 6B, the maximum value $\dot{V}_{EM}$ of the driving-wheel slip variation rate values $\dot{V}_E$ for the past 100 ms and the maximum value $\widetilde{TQ}_{OUTM}{}^*$ of the total driving-wheel torque values $\widetilde{TQ}_{OUT}{}^*$ for the past 100 ms are searched. More specifically, the total driving-wheel torque values $\widetilde{TQ}_{OUT}{}^*$ and the driving-wheel slip variation rate dalues $\dot{V}_E$ which are differential values of the driving-wheel slippages $V_E$ calculated on the basis of the driving wheel speeds Vw outputted from the driving wheel speed detector 1 and the driven-wheel speeds Vv outputted from the driven wheel speed detector 2 are temporarily stored in the random access memory 19, and the maximum value $\dot{V}_{EM}$ for the past 100 ms and the maximum value $\widetilde{TQ}_{OUTM}{}^*$ for the past 100 ms are selected from these values temporarily stored in the random access memory 19.

Subsequently, at a step S72 in FIGS. 6A and 6B, an effective torque $TQ_{INIT}$ to be utilized for increasing the speed of the vehicle (i.e., a value obtained by subtracting a surplus torque consumed for excessive slipping of the driving wheels Wr from the total driving-wheel torque $\widetilde{TQ}_{OUTM}{}^*$) is map-searched from the maximum value $\dot{V}_{EM}$ of the driving-wheel slip rate values and the maximum value $\widetilde{TQ}_{OUTM}{}^*$ of the total driving wheel torque values found at the step S71.

Figure 16:
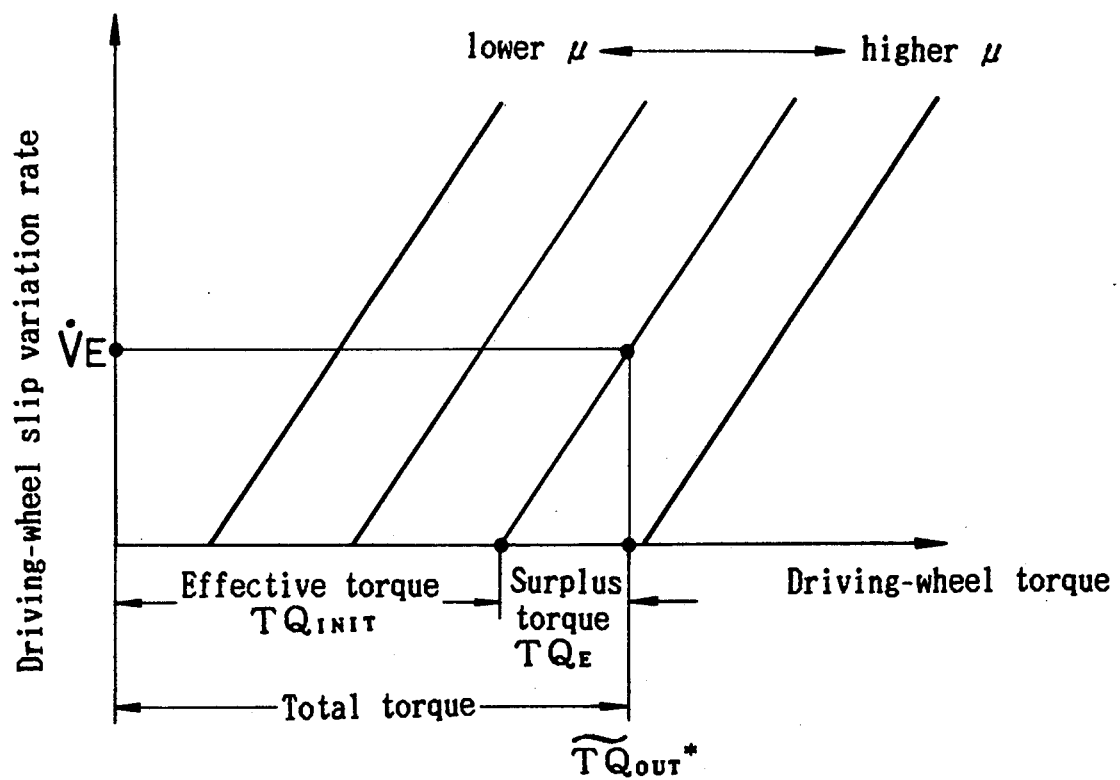
FIG. 16 is a graph for finding an effective driving-wheel torque $TQ_{INIT}$.

Description will now be made of another method for finding the effective torque $TQ_{INIT}$ of the driving wheels. FIG. 16 illustrates, by linear approximations, how the relationship between the total driving-wheel torque $\widetilde{TQ}_{OUT}{}^*$ and the driving-wheel slip variation rate $\dot{V}_E$ is varied depending upon a variety of road surface frictional coefficients. It can be understood from FIG. 17 that on a road having a lower frictional coefficient $\mu$, the driving-wheel slip variation rate $\dot{V}_E$ is increased with a smaller total driving wheel torque $\widetilde{TQ}_{OUT}{}^*$, resulting in an increased proportion of ineffective torque. This ensures that a surplus torque $TQ_E$ can be found from a intersection of the total driving-wheel torque $\widetilde{TQ}_{OUT}{}^*$ with the driving-wheel slip variation rate $\dot{V}_E$, and the effective torque $TQ_{INIT}$ of the driving wheels can be found from a point of intersection of a line of the road surface frictional coefficient $\mu$ with the axis of abscissas. Therefore, if the total driving-wheel torque values $\widetilde{TQ}_{OUT}{}^*$ and the driving-wheel slip variation rate values $\dot{V}_E$ relative to a variety of road surface frictional coeficients are stored as a function in the read only memory 18, the effective driving-wheel torque $TQ_{INIT}$ can be found in place of the method using the map-searching.

Figure 17:
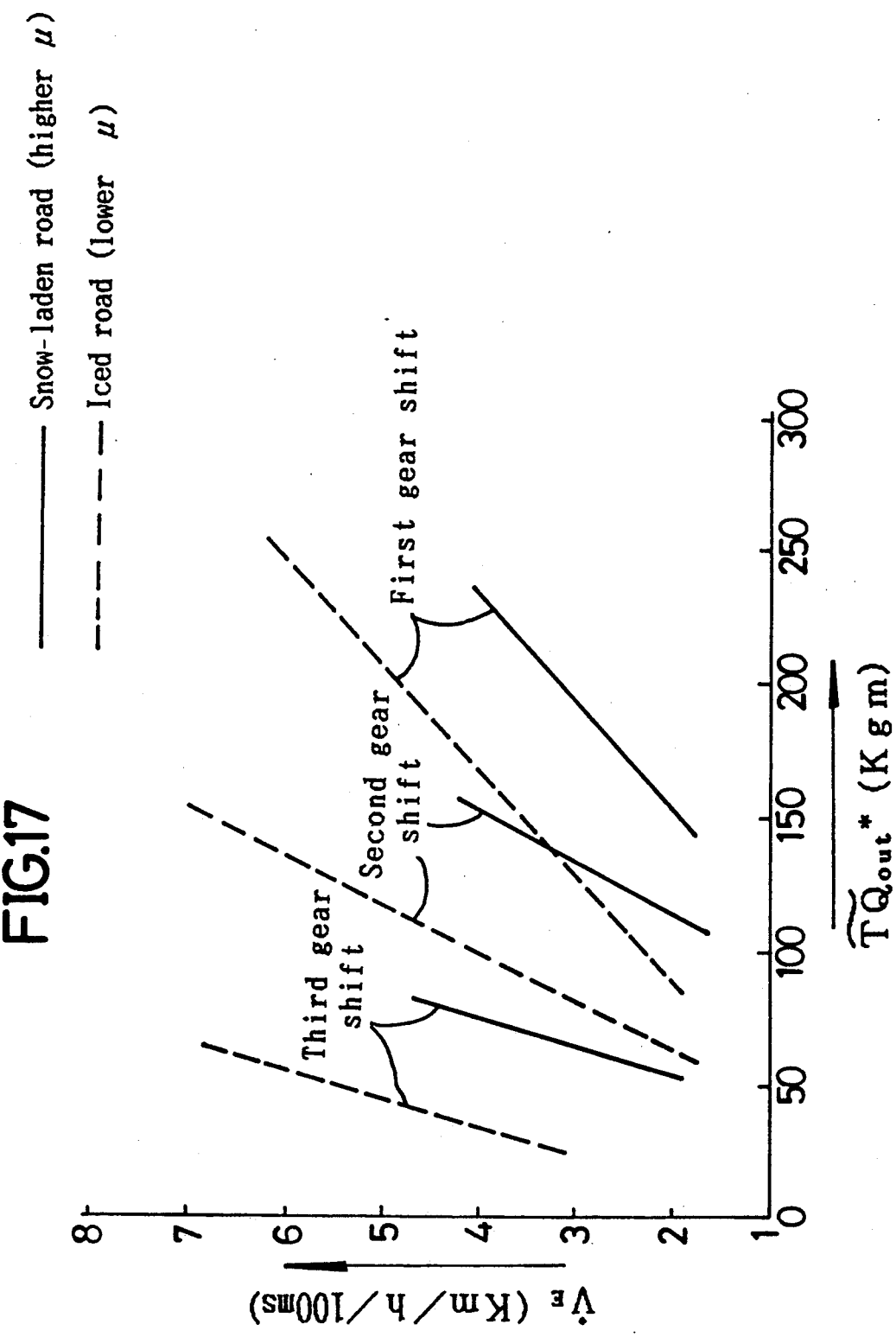
FIG. 17 is a graph illustrating a relationship between the total driving-wheel torque $TQ_{OUT}*$ and the driving-wheel slip variation rate $\dot{V}_E$.

Description will now be made of a further method for finding the effective torque $\widetilde{TQ}_{INIT}$. FIG. 17 illustrates the results of a linear regression analysis, by a method of least squares, of individual sampling data of total driving-wheel torque values $\widetilde{TQ}_{OUT}{}^*$ and driving-wheel slip variation rate values $V_E$, which were generated when the vehicle was driven to travel on an iced road and a snow-laden road with gear-positions fixed to produce a skidding, the former values being plotted on an axis of abscissas and the latter values being plotted on an axis of ordintes. As apparent from FIG. 18, it can be seen that the inclination of a line providing a relationship between the total driving-wheel torque $\widetilde{TQ}_{OUT}{}^*$ and the driving-wheel slip variation rate $V_E$ depends upon the gear-position, but not upon the magnitude of the road surface frictional coefficients (i.e., not upon whether on the iced road or on the snow-laden road). As the gear position is changed to a higher side, e.g., to a first gear shift, to a second gear shift and to a third gear shift, the inclination of each line is gradually increased. The reason is that the excessive driving-wheel torque is not used for increasing the speed of the vehicle and is consumed for an excessive slipping of the driving wheels to generate a rotative acceleration in a rotational inertia system between the internal combustion engine and the driving wheels. At this time, however, the inertia moment between the internal combustion engine and the driving wheels becomes a function of the gear position and as considered from the driving wheel side, such inertia moment is larger with a lower gear. In other words, with a lower gear, the rotational acceleration of the internal combusiton engine and a portion of the gears (a side near the internal combustion engine) is larger with the respect to the same driving-wheel acceleration. Therefore, in a lower gear having a larger inertia moment, the surplus driving-wheel torque is larger even at the same driving-wheel acceleration (driving-wheel slip variation rate). Consequently, with the lower gear, the inclination of the line is smaller.

From the fact that the inclination of the line indicating the relationship between the total driving-wheel torque $\widetilde{TQ}_{OUT}{}^*$ and the driving-wheel slip variation rate $V_E$ is determined unconditionally by the gear position independent of the road surface frictional coefficient, as described above, the surplus torque can be correctly determined by taking the gear position into consideration. The effective driving-wheel torque $TQ_{INIT}$ is found by subtracting such surplus torque from the total driving-wheel torque $\widetilde{TQ}_{OUT}$.

Figure 18:
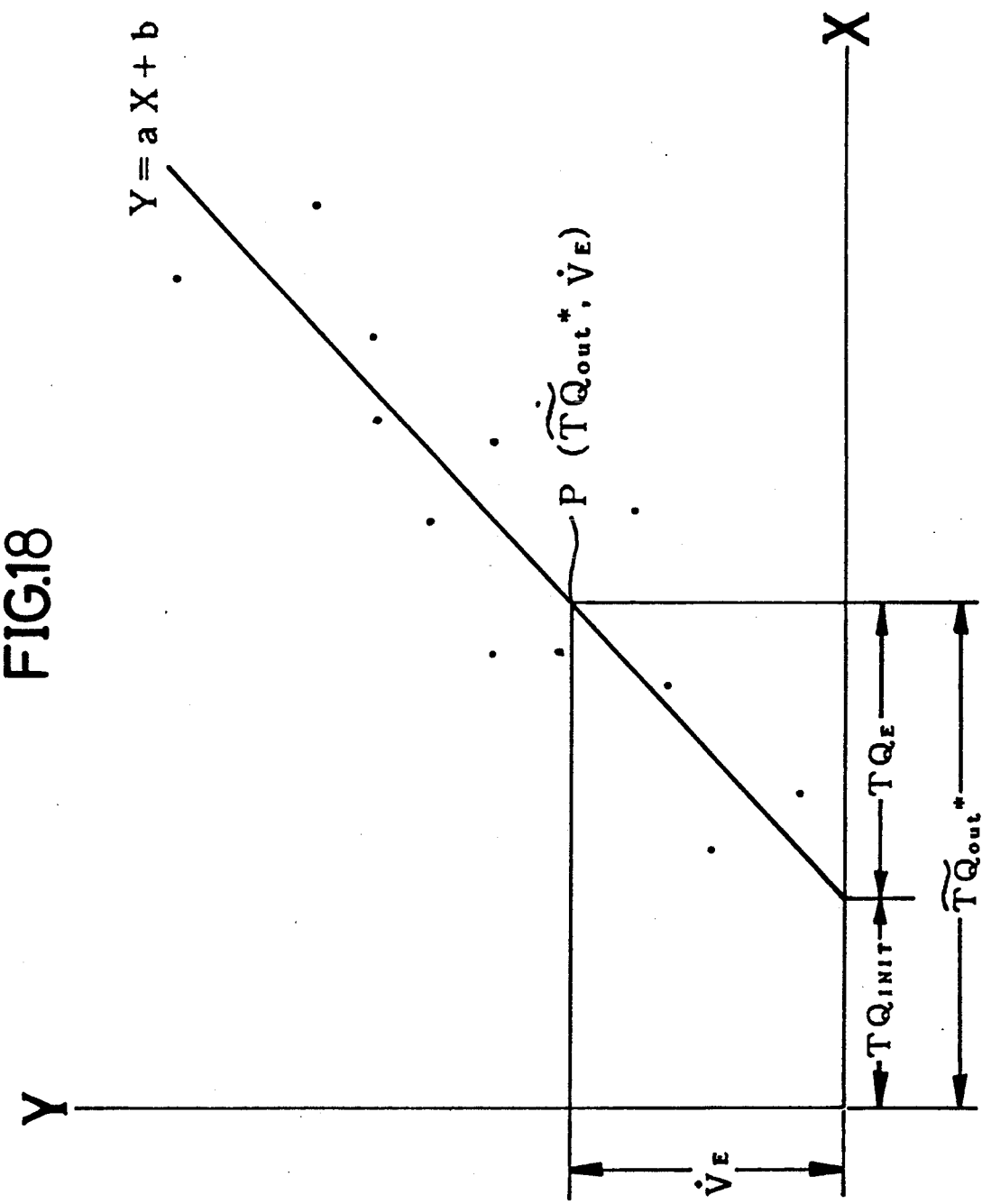
FIG. 18 is a graph illustrating another method for finding an effective driving-wheel torque $TQ_{INIT}$.

The process for finding the surplus torque will be described in detail. As shown in FIG. 18, the total driving-wheel torque $\widetilde{TQ}_{OUT}{}^*$ is taken on an X axis, and the driving-wheel slip variation rate $V_E$ is taken on a Y axis. A line $Y = aX + b$ is drawn which passes through a point P corresponding to a total driving-wheel torque and a driving-wheel slip variaiton rate $\dot{V}_E$ in a certain travelling condition and which has an inherent inclination a determined by the current gear position. In this case, an X intercept of such line represents a total driving-wheel torque $\widetilde{TQ}_{OUT}^*$, i.e., an effective driving-wheel torque $TQ_{INIT}$ at a time point when the driving-wheel slip variation rate $\dot{V}_E$ is zero. A surplus torque $TQ_E$ which is a difference between the total driving-wheel torque $\widetilde{TQ}_{OUT}^*$ and the effective torque $TQ_{INIT}$ is given according to the following expression by using the above-described inclination a:

$$TQ_E = 1/a \cdot \dot{V}_E$$

Hence, the effective torque $TQ_{INIT}$ is found according to the following expression:

$$TQ_{INIT} = \widetilde{TQ}_{OUT}^* - TQ_E = \widetilde{TQ}_{OUT}^* - 1/a \cdot \dot{V}_E$$

In the above way, if only the value of the constant a determined by the gear position irrespective of the magnitude of the current road surface frictional coefficient is stored in the read only memory 18, a surplus torque $TQ_E$ can be found by a product of the constant 1/a which is an inverse number of a and the driving-wheel slip variation rate $\dot{V}_E$, and further, a desired effective driving-wheel torque can be found from a difference between the total driving-wheel torque $\widetilde{TQ}_{OUT}^*$ and the surplus torque $TQ_E$.

Thus, when the throttle feed-back control is newly started at the step S10 in FIGS. 3A and 3B, the above-described $\theta_{THINIT}$ is used as an initial throttle opening degree. The initial throttle opoening degree corresponds to a throttle opening degree providing a torque resulting from substraction of the surplus torque $TQ_E$ consumed for the excessive slipping of the driving wheels from the effective driving-wheel torque $TQ_{INIT}$ utilized for increasing the speed of the vehicle, i.e., the total driving-wheel torque $TQ_{OUT}^*$, and therefore, it is possible to quickly converge the final throttle opening degree to a value which provides an optimal driving-wheel slip rate.

Then, at the step S73 in FIGS. 6A and 6B, it is decided whether or not the throttle initializating counter $CN_{THINIT}$ is zero, i.e., whether or not 100 ms has been elapsed. If YES, the throttle initializating flag $F_{THINIT}$ is set at a step S74. At a subsequent step S75, an initial throttle opening degree $\theta_{THINIT}$ is calculated according to the following expression:

$$\theta_{THINIT} = K_{PA} \cdot \frac{dTH}{dTQ} \cdot \frac{TQ_{INIT}}{G/R} + \theta_{TO}^*$$

wherein dTH/dTQ is a correcting factor indicating a variation in throttle opening degree required to provide a unit torque variation in the crank shaft, and $K_{PA}$ is an atmospheric pressure correcting factor. If the initial throttle opening degree $\theta_{THINIT}$ is found in this manner, the minimum value thereof is limited to $\theta_{TO}^*$ and the maximum thereof is limited to $\theta_{WOT}^*$ in the same manner as described above at steps S76 to S79.

When the throttle feed-back control is newly started at the step S10 in FIGS. 3A and 3B upon returning from the fuel cutting, the above-described throttle opening degree $\theta_{THINIT}$ is used as such initial throttle opening degree.

When the initial throttle opening degree has been determined at the step S3 in FIGS. 3A and 3B, it is decided at a step S53 whether the fuel cutting which is currently conducted is a first or another fuel cutting. If it is a first fuel cutting, the initial throttle opening degree $\theta_{THINIT}$ found at the step S3 is brought, at a step S54, into a desired throttle opening degree at a time point of return from the fuel cutting. If it has been decided at the step S53 that the fuel cutting is another fuel cutting, either smaller one of the desired throttle opening degree $\theta_{THO}^{N-1}$ at the time point of entering into the another fuel cutting and the intial throttle opening degree $\theta_{THINIT}$ at the time point of return from the another fuel cutting is selected at a step S55 as an initial throttle opening degree at the time point of return from the another fuel cutting, and the selected initial throttle opening degree $\theta_{THINIT}$ is used at the step S54 as a desired throttle opening degree $\theta_{THO}$ at the time point of return from the another fuel cutting. Therefore, the desired throttle opening degree at the time point of return from the fuel cutting is necessarily smaller than the desired throttle opening degree at the time point of entering into the fuel cutting, resulting in an avoidance of the disadvantage that the fuel cutting is repeatedly conducted.

Figure 8A:
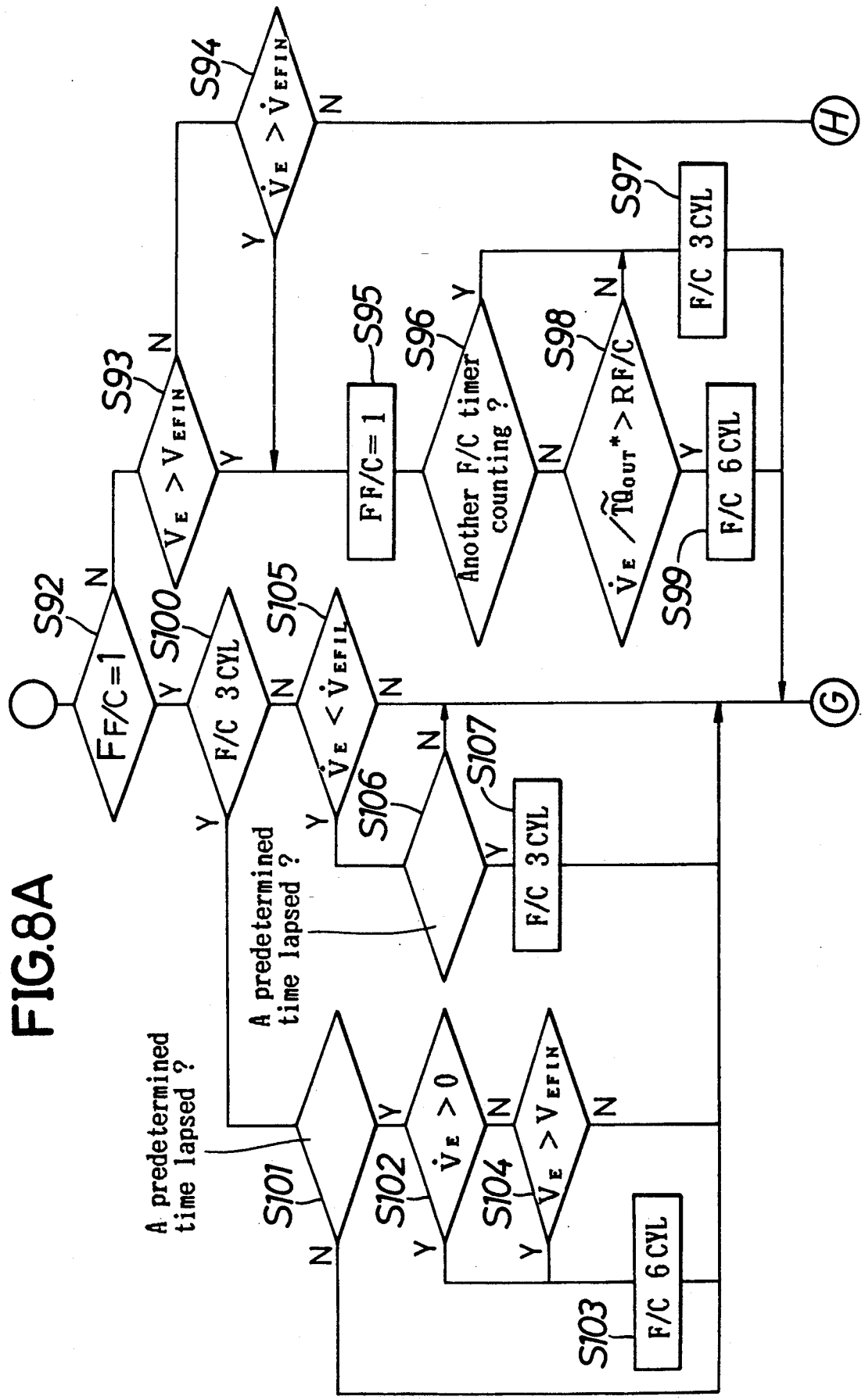
FIGS. 8A and 8B are flow charts illustrating a sub-routine for deciding a cutting of fuel and for determining the number of fuel-cut cylinders.
Figure 8B:
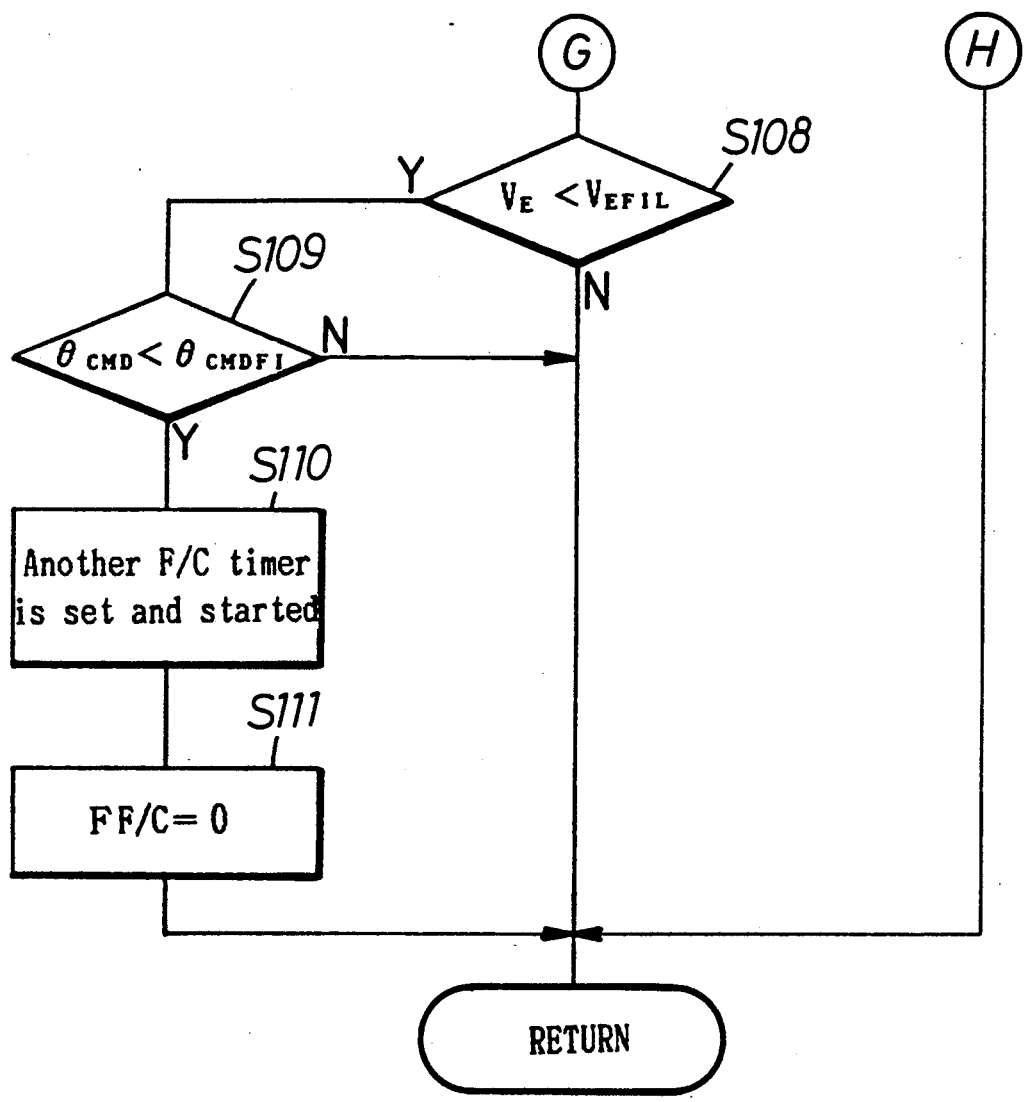
Figure 9:
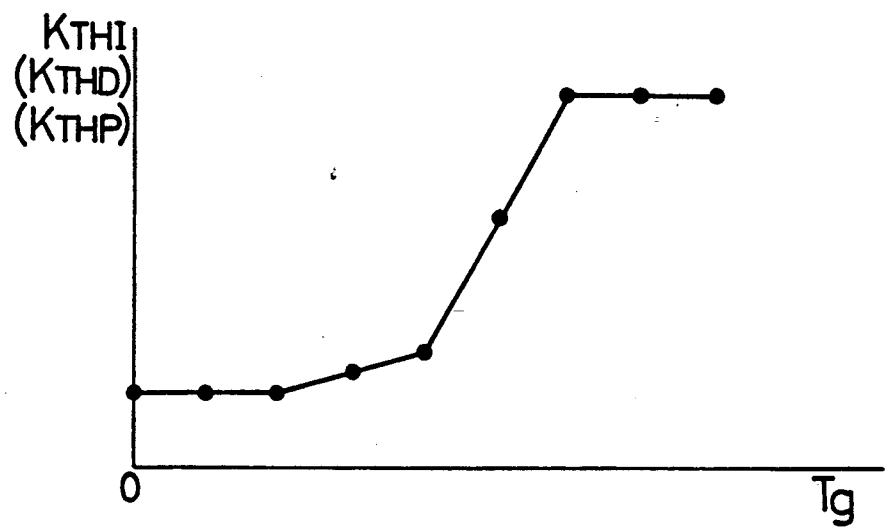
FIG. 9 is a graph illustrating characteristics of throttle feed-back control coefficients $K_{THP}$, $K_{THI}$ and $K_{THD}$.

FIGS. 8A and 8B illustrate a sub-routine for deciding the fuel cutting and for determining the number of fuel-cut cylinders. First, if it has been decided at a step S92 that the processing is not in cutting of fuel and if the driving-wheel slip variation rate $\dot{V}_E$ exceeds a reference value $\dot{V}_{EFIH}$ at a step 94 even if the driving-wheel slippage $V_E$ exceeds a second judgement value $V_{EFIH}$ or is equal to or less than $V_{EFIH}$ at a step 93, the fuel cutting flag $F_{F/C}$ is set at a step S95, so that the processing enters into the fuel cutting. At a subsequent step S96, it is decided whether or not a fuel cutting timer which will be described hereinafter is in counting of 500 ms. If YES, i.e., if in the another fuel cutting, the number of the fuel-cut cylinders is decided to three at a step S97. This avoids that the driving-wheel torque is extremely reduced at the time point of entering into the another fuel cutting. If an excessive slippage has been detected as a result of the $\dot{V}_E/TQ_{OUT}^*$ exceeding a reference value $R_{F/C}$ at a step S98 even if not in another fuel cutting, the number of the fuel-cut cylinders is determined to six at a step S99, so that the output torque from the internal combustion engine is limited to a greater extent.

Alternatively, if it has been decided at the step S92 that the processing is in fuel cutting, the control of the fuel cutting for either three or six of the six cylinders in the internal combustion engine E is conducted at the following steps S100 to S107. More specifically, if the number of the fuel-cut cylinders is three of the six cylinders at the step S100 and if it is decided at a step S101 that a predetermined time has been elapsed, it is decided at a step S102 whether the driving-wheel slip variation rate $\dot{V}_E$ is positive or negative. If the $V_E$ is positive, i.e., if the driving-wheel slippage $V_E$ has been increased, the number of the fuel-cut cylinders is increased to six at a step S103. If the driving-wheel slippage $V_E$ exceeds the second decision value $V_{EFIN}$ at a step S104 even if the driving-wheel slip variation rate $\dot{V}_E$ is negative, the number of the fuel-cut cylinders is likewise increased to six at the step S103. Alternatively, if the number of the fuel-cut cylinders is six at the step S100, and if it is dicided at a step S105 that the driving-wheel slip variation rate $\dot{V}_E$ is smaller than the reference value $\dot{V}_{EFIL}$ and it is decided at a step S106 that a predetermined time has been elapsed, the number of the fuel-cut cylinders is reduced from six to three at a step S107. Thus, an optimal number of the fuel-cut cylinders is selected so that it is suitable to the current slipping condition of the driving wheels Wr.

Then, it is decided at a step S108 whether or not the driving wheel slippage $V_E$ is less than a third judgement value $V_{EFIL}$. If NO, the cutting of fuel is continued as it is. Alternatively, if it has been decided at the step S108 that the driving-wheel slippage $V_E$ is less than the third judgement value $V_{EFIL}$, it is decided at a step S109 whether or not the deviation $\theta_{CMD}$ between the actual throttle opening degree and the desired throttle opening degree has become smaller than a reference value $\theta_{CMDFI}$. The cutting of fuel is continued until the deviation $\theta_{CMD}$ becomes less than the reference value $\theta_{CMDFI}$. This ensures that the retard of response of the throttle valve 9 due to the driving speed of the pulse motor 8 and the like permits the returning from the fuel cutting to be conducted before the throttle valve 9 is sufficiently opened, thereby avoiding that the entering into and returning from the fuel cutting is repeated. If it is confirmed at the step S109 that the throttle valve 9 has been sufficiently closed, an another fuel cutting timer is set at 500 ms and started at a step S110. Then, at a step S111, the returning from the fuel cutting is conducted and the fuel cutting flag $F_{F/C}$ is reset at zero.

Figure 19:
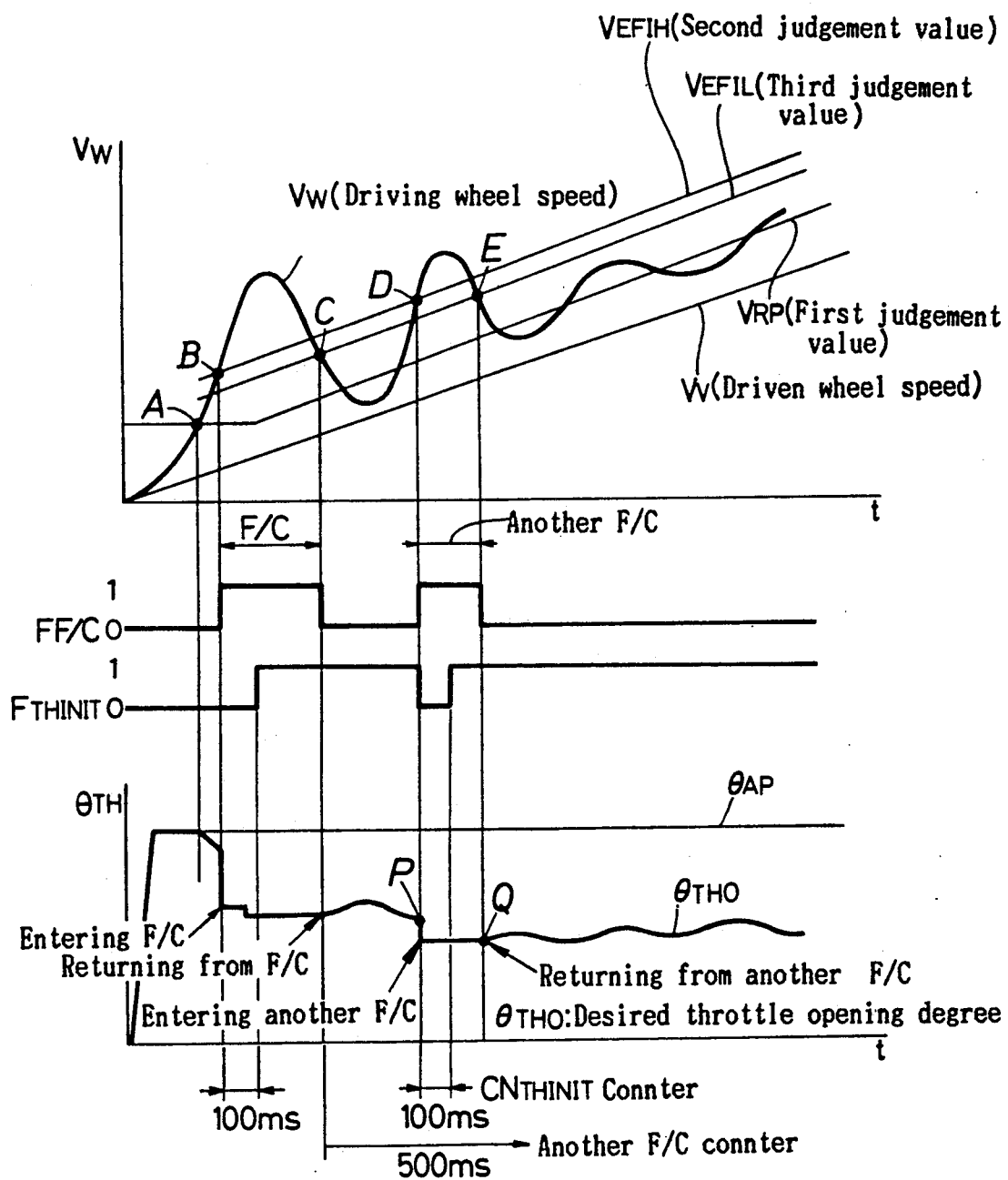
FIG. 19 is a time chart in a fuel cutting control.

The above operation described in connection to the flow chart in FIGS. 8A and 8B will be further described below in connection to a time chart in FIG. 19.

If an accelerator pedal is depressed to open the throttle opening degree to a degree of opening of the accelerator pedal, the vehicle is speed-increased, so that the driven wheel speed Vv is gradually increased. During this time, the driving wheel speed Vw becomes more than the driven wheel speed Vv to exceed the first judgement value $V_{RP}$ (an A point) as a result of the driving wheels Wr becoming a slipping state, the throttle feed-back control is started, so that the throttle opening degree $\theta_{TH}$ begines to decrease. However, if the driving wheel speed Vw is further increased to exceed the second judgement value $V_{EFIH}$ (a B point), the processing enters into the fuel cutting to substantially reduce the output torque from the internal combustion engine, so that the driving wheel speed Vw begins soon to decrease. For 100 ms from the time point of entering into the fuel cutting, an initial throttle opening degree at the time point of return from the fuel cutting is calculated, and the throttle valve is previously driven toward that initial throttle opening degree. If the driving wheel speed Vw is lower than the third judgement value $V_{EFIL}$ (a C point), the processing is returned from the fuel cutting to start the throttle feed-back control from such initial throttle opening degree.

If the driving wheel speed Vw exceeds the second judgement value $V_{EFIH}$ again within 500 ms from the returning from the fuel cutting (a D point), the processing enters into the another fuel cutting, so that the driving wheel speed Vw begines to decrease again. If the driving wheel speed Vw is thus lower than the third judgement value $V_{EFIL}$ (an E point), the processing is returned from the another fuel cutting to pass to the throttle feed-back control again. At this time, the throttle opening degree is restricted to either smaller one of the initial throttle opening degree Q calculated for 100 ms from the entering into the another fuel cutting and the throttle opening degree P at the time point of entering into the another fuel cutting (FIG. 19 illustrates the case where the initial throttle opening degree Q is used as it is) and therefore, repeating of the entering into and the returning from the fuel cutting is prevented.

What is claimed is:

1. A system for controlling torque of a driving wheel, comprising a driving-wheel torque reducing means for reducing an output from an internal combustion engine connected to the driving wheel when an excessive slip of the driving wheel is detected, thereby inhibiting the excessive slip of the driving wheel, wherein said driving-wheel torque reducing means comprises a means for finding a total driving-wheel torque transmitted from said internal combustion engine to said driving wheel, a means for finding a surplus torque consumed for the excessive slip of the driving wheel from said total driving-wheel torque, a means for finding an effective driving-wheel torque transmittable to a road surface by subtracting said surplus torque from said total driving wheel torque, and a means for reducing the output from the internal combustion engine for obtaining said effective driving-wheel torque.

2. A system for controlling torque of a driving wheel according to claim 1, wherein said total driving-wheel torque is found from a torque produced by the engine, a gear ratio indicative of a ratio between input and output numbers of revolutions of a transmission, and a transmitting efficiency of the transmission.

3. A system for controlling torque of a driving wheel according to claim 2, wherein said torque produced by the engine is found from an engine load, a number of revolutions of engine and an air-fuel ratio.

4. A system for controlling torque of a driving wheel according to claim 1, wherein a filtering treatment with a first-order lag is given to said total driving-wheel torque.

5. A system for controlling torque of a driving wheel according to claim 1, wherein said surplus torque is a function of a ratio of variation in excessive slip of the driving wheel, relative to time passage.

6. A system for controlling torque of a driving wheel according to claim 1, wherein said effective torque is found by map-searching from the total torque and the surplus torque.

7. A system for controlling torque of a driving wheel according to claim 1, wherein said effective torque is found by a linear type approximation from the total torque and the surplus torque.

8. A system for controlling torque of a driving wheel according to claim 1, wherein said means for reducing the output from said internal combustion engine is a throttle opening control means for controlling opening and closing of a throttle valve of the engine, and a throttle opening degree to be controlled is found from said effective torque.

9. A system for controlling torque of a driving wheel according to claim 8, wherein operation of said throttle opening control means is conducted when the excessive slip of the driving wheel is equal to or more than a predetermined judgment value.

10. A system for controlling torque of a driving wheel according to claim 9, wherein said means for reducing the output from the internal combustion engine is a fuel cut means for cutting fuel supply to the engine, and a judgement value for the excessive slip of the driving wheel for providing fuel cut is larger than a predetermined judgment value for conducting a throttle feed-back.

11. A system for controlling torque of a driving wheel according to claim 8, wherein said throttle opening degree is found from a throttle opening degree variation amount which provides a unit torque variation of the engine, an atmospheric pressure, a gear ratio indicative of a ratio between input and output numbers of revolutions of a transmission, a transmitting efficiency of the transmission providing an amplitude of power loss in the transmission, and the throttle opening degree corresponding to an engine friction torque.

12. A system for controlling torque of a driving wheel according to claim 1, wherein said means for reducing the output from the internal combustion engine is a throttle-valve opening degree feed-back means for controlling opening and closing of a throttle valve of the engine, and an initial throttle opening degree at the start of a feed back is found from said effective torque.

13. A system for controlling torque of a driving wheel according to claim 12, wherein a feed-back control gain of said throttle-valve opening degree feed-back means is a function of a vehicle speed.

14. A system for controlling torque of a driving wheel according to claim 12, wherein an upper limit and/or a lower limit is provided to the throttle opening degree obtained by the feed-back control of the throttle opening degree.

15. A system for controlling torque of a driving wheel according to claim 14, wherein said upper limit is a minimum throttle opening degree in a range of throttle opening degree which generates a maximum engine torque.

16. A system for controlling torque of a driving wheel according to claim 14, wherein said lower limit is a throttle opening degree corresponding to an engine friction torque.

17. A system for controlling torque of a driving wheel according to claim 14, wherein said upper limit and/or said lower limit is a function of the number of revolutions of engine.

18. A system for controlling torque of a driving wheel according to claim 12, wherein said means for reducing the output from the internal combustion engine is a fuel cut means for cutting fuel supply to the engine, and the throttle feed back control is conducted from a time point of returning from the fuel cutting when the fuel cut is terminated.

19. A system for controlling torque of a driving wheel according to claim 1, wherein said means for reducing the output the internal combustion engine is a fuel cut means for cutting fuel supply to the engine, and said effective torque is found during a fuel cut operation.

20. A system for controlling torque of a driving wheel according to claim 1 or 19, wherein said means for reducing the output from the internal combustion engine is a fuel cut means for cutting fuel supply to the engine, and said effective torque is found from the total torque and the surplus torque within a predetermined period of time from the start of a fuel cut operation.

21. A system for controlling torque of a driving wheel according to claim 1 or 19, wherein said means for reducing the output from the internal combustion engine is a fuel cut means for cutting fuel supply to the engine, and said effective torque is found from the total torque and a maximum value of the surplus torque within a predetermined period of time from the start of the fuel cut operation.

22. A system for controlling torque of a driving wheel, in which when an excessive slip of a driving wheel is detected, the excessive slip is inhibited by an output reducing means for reducing the output from an internal combustion engine connected to the driving wheel, wherein said output reducing means comprises a means for driving a throttle valve for opening and closing when the excessive slip has exceeded a first judgment value, thereby providing a feed-back control, a means for conducting a fuel cut operation by cutting fuel supply to the engine on the basis of a decision that a fuel cut condition is established when the excessive slip has exceeded a second judgment value larger than the first judgment value, and for terminating the fuel cut operation on the basis of a decision that a fuel-cut return condition is established when the excessive slip has become lower than a third judgment value smaller than the second judgment value, a means for calculating during the fuel cut operation a throttle feed-back initial opening degree at the time of returning from the fuel cut operation of cutting fuel supply to the engine, based on a total torque transmitted from the internal combustion engine to the driving wheel and a surplus torque consumed for the excessive slip of the driving wheel, a means for deciding that the condition for another fuel-cut operation is established when a fuel-cut condition has been established again within a predetermined period of time from said returning from the fuel cut operation, and a means for setting the throttle feed-back initial opening degree at a time point of returning from said another fuel-cut operation to be a level less than a throttle opening degree at a time point of entering said another fuel-cut operation.

23. A system for controlling torque of a driving wheel according to claim 22, wherein said fuel-cut returning condition is established, the returning from the fuel cut operation is prohibited until the throttle valve is driven to a position near a throttle opening degree obtained at an initial stage of the returning from the fuel cut operation.

24. A system for controlling torque of a driving wheel according to claim 22, wherein the number of cylinders to which fuel supply is cut is usually set at a level equal to or less than the number of cylinders to which fuel supply is cut at the time of establishment of the another fuel cutting condition.

25. A system for controlling torque of a driving wheel, comprising a driving-wheel torque reducing means for reducing an output from an internal combustion engine connected to the driving wheel when an excessive slip of the driving wheel is detected, thereby inhibiting the excessive slip of the driving wheel, wherein said driving-wheel torque reducing means comprises a means for finding a total driving-wheel torque transmitted from the internal combustion engine to the driving wheel, a means for finding a surplus torque consumed for an excessive slip of the driving wheel from the total driving-wheel torque, a means for finding an effective driving-wheel torque transmittable to a road surface by subtracting said surplus torque from said total driving-wheel torque and a means for reducing the output from the internal combustion engine for achieving said effective torque, said means for finding the surplus torque being arranged to find the surplus torque from a ratio of variation in slip of the driving wheel relative to time passage and a gear position of a transmission which transmits the output from the internal combustion engine to the driving wheel.

26. A system for controlling torque of a driving wheel according to claim 25, wherein said means for finding said surplus torque of the driving wheel is found by a linear function from said ratio of variation in slip of the driving wheel relative to time passage and the gear position of said transmission.

27. A system for controlling torque of a driving wheel, including a first control means for controlling a first controlled object which affects a driving-wheel torque and a second control means for controlling a second controlled object which affects the driving-wheel torque, the first and second control means serving to control the driving-wheel torque, wherein the system further comprises:

- a first control amount calculating means for calculating an amount of control for the first controlled object;
- a conversion amount calculating means for converting an amount of reduction in a driving-wheel torque, which is produced by said amount of control for the first controlled object, into a converted amount of control for the second controlled object that will cause a similar amount of reduction in the driving-wheel torque;
- a second control amount calculating means for calculating an amount of control for the second controlled object;
- a second control amount correcting means for correcting said amount of control for the second controlled object with said converted amount of control for the second controlled object; and
- an output means for outputting said amount of control for the first controlled object and said amount of control for the second controlled object which has been corrected by said second control amount correcting means, to said first and second control means, respectively.

28. A system for controlling torque of a driving wheel according to claim 27, wherein said first controlled object is an ignition timing, and said second controlled object is a throttle opening degree, and wherein said conversion amount calculating means operates to find said converted amount of control for the second controlled object according to the following expression:

$$Q_{THIGR} = TQ_{IGR} \cdot dTH/dTQ \cdot K_{FA}$$

wherein $TQ_{IGR}$ is an amount of variation in engine torque due to a variation in ignition timing; $dTH/dTQ$ is a throttle variation amount (a function of the number of revolutions of engine) which causes a unit torque variation; and $K_{FA}$ is an atmospheric pressure correcting value.

* * * * *